United States Patent [19]
Poon

[11] Patent Number: 5,592,589
[45] Date of Patent: Jan. 7, 1997

[54] TREE-LIKE PERCEPTRON AND A METHOD FOR PARALLEL DISTRIBUTED TRAINING OF SUCH PERCEPTRONS

[75] Inventor: Chi-Sang Poon, Lexington, Mass.

[73] Assignee: Massachusetts Institute of Technology, Cambridge, Mass.

[21] Appl. No.: 88,884

[22] Filed: Jul. 8, 1993

[30] Foreign Application Priority Data

Jul. 8, 1992 [GB] United Kingdom .................. 9214514

[51] Int. Cl.$^6$ .................. G06E 1/00; G06E 3/00
[52] U.S. Cl. .................. 395/24; 395/21; 395/23
[58] Field of Search .................. 395/20–25, 27; 382/12–15, 155–159

[56] References Cited

U.S. PATENT DOCUMENTS

| | | | |
|---|---|---|---|
| 3,950,733 | 4/1976 | Cooper et al. | 340/172.5 |
| 4,326,259 | 4/1982 | Cooper et al. | 364/715 |
| 4,760,604 | 7/1988 | Cooper et al. | 382/15 |
| 4,802,103 | 1/1989 | Faggin et al. | 364/513 |
| 4,807,168 | 2/1989 | Moopenn et al. | 364/602 |
| 4,951,239 | 8/1990 | Andes et al. | 395/24 |
| 5,033,006 | 7/1991 | Ishizuka et al. | 364/513 |
| 5,045,713 | 9/1991 | Shima | 307/201 |
| 5,056,037 | 10/1991 | Eberhardt | 364/513 |
| 5,060,278 | 10/1991 | Fukumizu | 382/14 |
| 5,087,826 | 2/1992 | Holler et al. | 395/24 |
| 5,095,443 | 3/1992 | Watanabe | 395/11 |
| 5,165,010 | 11/1992 | Masuda et al. | 395/27 |
| 5,239,594 | 8/1993 | Yoda | 382/15 |
| 5,247,206 | 9/1993 | Castro | 395/24 |
| 5,253,329 | 10/1993 | Villarreal et al. | 395/24 |
| 5,402,522 | 3/1995 | Alkon et al. | 395/24 |

OTHER PUBLICATIONS

P. D. Wasserman & T. Schwartz, "Neural Networks: Part 2: What are they and why is everybody so interested in them now?", IEEE Expert, pp. 10–15, Spring 1988.

A. F. Murray & A. V. W. Smith, "Asynchronous VLSI Neural Networks Using Pulse–Stream Arithmetic", IEEE Journal of Solid–State Circuits, vol. 23, No. 3, Jun. 1988, pp. 688–697.

A. F. Murray et al., "Asynchronous VLSI Neural Networks Using Pulse–Stream Arithmetic", IEEE Journal of Solid State Circuits, vol. 23, Jun. 1988, pp. 56–65.

H. P. Graf et al., "VLSI Implementation of a Neural Network Model" IEEE Computer, Mar. 1988.

R. R. Leighton, "The Aspirin/Migraines Neural Network Software", User's Manual, Release V6.0, Mitre Corporation, Oct. 29, 1992.

(List continued on next page.)

*Primary Examiner*—Robert W. Downs
*Assistant Examiner*—Tariq R. Hafiz
*Attorney, Agent, or Firm*—Wolf, Greenfield & Sacks, P.C.

[57] ABSTRACT

Constraints placed on the structure of a conventional multi-layer network consequently enable learning rules to be simplified and the probability of reaching only local minima to be reduced. These constraints include neurons which are either inhibitory or excitatory. Also, for each neuron in the hidden layer, there is at most one synapse connecting it to a corresponding neuron in the output layer. The result is a tree-like structure which facilitates implementation of large scale electronic networks, and allows for parallel training of parts of the network. Additionally, each neuron in the hidden layer receives a reinforcement signal from its corresponding neuron in the output layer which is independent of the magnitude of synapses posterior to the hidden layer neuron. There may be multiple hidden layers, wherein each layer has a plurality of neurons, and wherein each neuron in an anterior layer connects to only one neuron in any posterior layer. In training, weights of synapses connected anterior to any neuron are adjusted with the polarity opposite the polarity of the error signal when the polarity determined for the path for the neuron is inhibitory. The adjustment is made with the polarity of the error signal when the polarity determined for the path for the neuron is excitatory.

9 Claims, 5 Drawing Sheets

OTHER PUBLICATIONS

S. Y. Kung et al., "A Unified Systolic Architecture for Artificial Neural Networks", Journal of Parallel & Distributed Computing, vol. 6, pp. 358–387 (1989).

A. G. Barto et al., "Gradient Following Without Back–Propagation In Layered Networks", Proc. IEEE First Annual Int'l Conference on Neural Networks. II: 629–636 (San Diego, CA, 1987).

R. Hecht–Nielsen, "Theory of the Backpropagation Neural Network", Proc. Int. Joint Conf. Neural Networks, vol. 1, pp. 593–605, 1989.

F. Crick et al., "Certain Aspects of the Anatomy and Physiology of the Cerebral Cortex", In: Parallel Distributed Processing: Explorations in the Microstructure of Cognition. vol. 2 (eds Rumelhart, D. E., McClelland, J. L. and the PDP Research Group), pp. 333–371 (MIT Press, Cambridge, MA 1986).

D. E. Rumelhart et al., "Learning Internal Representations by Error Propagation", In: Parallel Distributed Processing: Explorations in the Microstructure of Cognition. vol. 1. (eds Rumelhart, D. E. and McClelland, J. L. and the PDP Research Group) pp. 318–362 (MIT Press, Cambridge, MA, 1986).

T. H. Brown et al., "Hebbian Synapses: Biophysical Mechanisms and Algorithms", Annu. Rev. Neurosci. 1990, vol. 13, pp. 475–511.

S. T. Kim et al., "Algorithmic Transformations for Neural Computing and Performance of Supervised Learning on a Dataflow Machine", IEEE Trans. on Software Engineering, vol. 18, No. 7, Jul. 1992, pp. 613–623.

W.–M. Lin et al., "Algorithmic Mapping of Neural Network Models onto Parallel SIMD Machines", IEEE Trans. on Computers, vol. 40, No. 12, Dec. 1991, pp. 1390–1401.

A. Blumer et al., "Learnability and the Vapnik–Chervonenkis Dimension", Journal of the Association for Computing Machinery, vol. 36, No. 4, Oct. 1989, pp. 929–965.

R. D. Hawkins et al., "A Cellular Mechanism of Classical Conditioning in Aplysia: Activity–Dependent Amplification of Presynaptic Facilitation", Science, vol. 219, 28 Jan. 1993.

P. Mazzoni et al., "A more biologically plausible learning rule for neural networks", Proc. Natl. Acad. Sci. USA, vol. 88, pp. 4433–4437, May 1991, Neurobiology.

J. Hart, Jr. et al., "Neural subsystems for object knowledge", Nature, vol. 359, 3 Sep. 1992, pp. 61–65.

F. Crick, "The recent excitement about neural networks", Nature, vol. 337, 12 Jan. 1989, pp. 129–132.

K. Hornik, "Approximation Capabilities of Multilayer Feedforward Networks", Neural Networks, vol. 4, pp. 251–257, 1991.

B. Giraud et al., "Optimal Approximation of Square Integrable Functions by a Flexible One–Hidden–Layer Neural Networks of Excitatory and Inhibitory Neuron Pairs", Neural Networks, vol. 4, pp. 803–815, 1991.

T. J. Sejnowski et al., "Parallel Networks that Learn to Pronounce English Text", Complex Systems, vol. 1, (1987), pp. 145–168.

M. Gori et al.,"On the Problem of Local Minima in Back–Propagation", IEEE Transactions on Pattern Analysis and Machine Intelligence, vol. 14, No. 1, Jan. 1992, pp. 76–85.

J. F. Kolen et al., "Learning in Parallel Distributed Processing Networks: Computational Complexity and Information Content", IEEE Transactions and Systems, Man, and Cybernetics, vol. 21, No. 2, Mar./Apr. 1991, pp. 359–367.

P. S. Goldman–Rakic, "Changing Concepts of Cortical Connectivity: Parallel Distributed Cortical Networks", Neurobiology of Neocortex, pp. 177–202 (eds. P. Rakie et al., John Wiley & Sons, 1988.).

M. S. Livingstone et al., "Psychophysical Evidence for Separate Channels for the Perception of Form, Color, Movement, and Depth", Journal of Neuroscience, Nov. 1987, 7(11): pp. 3416–3466.

I. McLaren, "The Computational Unit as an Assembly of Neurones: an Implementation of an Error Correcting Learning Algorithm", In: The Computing Neuron (eds. Durbin, R., Miall, C., and Mitchison, G.) pp. 160–179 (Addison–Wesley, Reading, MA, 1989).

J. C. Houk et al., "Distributed Sensorimotor Learning", pp. 1–28, to appear in Tutorials in Motor Behavior II, G. Stelmach et al., eds. Elsevier Science Publishers, B.U., Amsterdam, the Netherlands, 1992.

S. Zeki et al., "The functional logic of cortical connections", Nature, vol. 335, 22 Sep. 1988, pp. 311–317.

J. S. Vitter et al., "Learning in Parallel", Information and Computation, vol. 96, pp. 179–202, (1992).

R. Durbin et al., "Product Units: A Computationally Powerful and Biologically Plausible Extension to Backpropagation Networks", Neural Computation, vol. 1, pp. 133–142, (1989).

T. Carney et al., "Parallel processing of motion and colour information", Nature, vol. 328, 13 Aug. 1987, pp. 647–649.

D. H. Ballard et al., "Parallel visual computation", Nature, vol. 306, 3 Nov. 1983, pp. 21–26.

M. Jabri et al., "Weight Perturbation: An Optimal Architecture & Learning Technique for Analog VLSI Feedforward and Recurrent Multilayer Networks", Neural Computation, vol. 3, pp. 546–565, (1991).

Y. Qiao et al., "Local learning algorithm for optical neural networks", Applied Optics, vol. 31, No. 17, 10 Jun. 1992, pp. 3285–3288.

J. H. Byrne, "Cellular Analysis of Associative Learning", Physiological Reviews, vol. 67, No. 2, Apr. 1987, pp. 329–439.

L. M. Reyneri et al., "An Analysis on the Performance of Silicon Implementations of Backpropagation Algorithms for Artificial Neural Networks", IEEE Transactions on Computers, vol. 40, No. 12 Dec. 1991, pp. 1380–1389.

M. Constantine–Paton, "NMDA Receptor as a Mediator of Activity–dependent Synaptogenesis in the Developing Brain", Cold Spring Harbor Symposium on Quantitative Biology, vol. LV, Cold Spring Harbor Laboratory Press, 1990, pp. 431–443.

D. Purves et al., "Trophic regulation of nerve cell morphology and innervation in the autonomic nervous system", Nature, vol. 336 10 Nov. 1988, pp. 123–128.

S. Rabacchi et al., "Involvement of the N–methyl D–aspartate (NMDA) Receptor in Synapse Elimination During Cerebellar Development", Science, vol. 256, 26 Jun. 1992, pp. 1823–1825.

M. A. Gluck et al., "Modeling the Neural Substrates of Associative Learning and Memory: A Computational Approach", Psychological Review, 1987, vol. 94, No. 2, pp. 176–191.

Tesauro, G. and Janssens, R., "Scaling relationships in backpropagation learning: dependence on training set size", Complex Systems 1: pp. 367–372 (1987).

Caviglia, Daniele D. et al., "A CMOS Analogue Architecture for Adaptive Neural Networks", in Sami, M. and Calzadilla–Daguerre, J. (eds., Silicon Architectures For Neural Nets, Elsevier Science Publishers B.V. (North–Holland), pp. 113–123, 1991.

Ouali, J. em et al., "Distributed large neural networks on silicon", in Sami, M. and Calzadilla–Daguerre, J. (eds.), Silicon Architectures For Neural Nets, Elsevier Science Publishers B.V. (North–Holland), pp. 11–29, 1991.

James L. McClelland, David E. Rumelhart, "Explorations in Parallel Distributed Processing, A Handbook of Models, Programs, and Exercises," The MIT Press, Fourth Printing, 1989, pp. 137–141.

Wang et al, "Cumulant–Based parameter estimation using neural networks"; ICASSP 90, pp. 2369–2372 vol. 5, 3–6 1990.

Huang et al, "A neural net approach to speech recognition"; ICASSP 88, pp. 99–102 vol. 1, 11–14 Apr. 1988.

Brown et al, "Artificial neural network on a SIMD architecture"; Proceedings. The 2nd symposium on the fromtiers of massively parallel computation, pp.43–47, 10–12 Oct. 1988.

TREE-LIKE PERCEPTRON AND A METHOD FOR PARALLEL DISTRIBUTED TRAINING OF SUCH PERCEPTRONS

FIELD OF THE INVENTION

This invention is related to artificial neural networks, generally, and to structures of artificial neural networks and methods for training such networks to improve speed of convergence in training. In particular, the invention is related to parallel training of such networks.

BACKGROUND OF THE INVENTION

A multilayer perceptron trained by backpropagation is a widely used model of artificial and biological neural information processing. FIG. 1 is a diagrammatic representation of such a conventional multilayer perceptron (MLP). It includes an input layer 10 with I neurons 11 respectively having outputs $x_1, \ldots, x_i, \ldots x_I$. A neuron is a processing unit which provides an output according to an activation function in response to an input. The activation function defines a relationship between the net input to the neuron and the output of the neuron. Input layer neurons are commonly buffers, where the activation function is the identity function. Other functions are also possible. In some cases the input layer neurons are a form of transducer which transforms some physical entity such as light, into a signal which may be processed by the network, such as an electrical signal. A hidden layer 12 has J neurons 13 with outputs $Y_1, \ldots, Y_j, \ldots Y_J$. Each hidden layer neuron is connected to an input layer neuron i with a connection, commonly called a synapse 16, which has a connection weight $w_{ji}$ associated with it. An output layer 14 of K neurons 15 provides outputs $z_1, \ldots, z_k, \ldots z_K$. Each output layer neuron k is connected to a hidden layer neuron j with a synapse 17 which has a connection weight $w_{kj}$.

Each neuron is assumed to be bipolar (identified by double circles in FIG. 1), meaning the connection weight of any posterior synapse (i.e., a synapse connecting an output of the neuron to the input of another neuron) may be both positive or negative. (An anterior synapse of a neuron is connected between an input of the neuron and an output of another neuron). The activation function f for a neuron is nonlinear and is typically sigmoidal, typically with saturation ranges at 0 and 1.

Each synapse 16 between an input layer neuron 11 and a hidden layer neuron 13 connects the output of the input layer neuron to an input of the hidden layer neuron. The output of the input layer neuron is multiplied by the connection weight associated with the synapse 16. The hidden layer neuron has multiple inputs which are summed together to provide a net input which is subjected to its activation function. By applying the activation function to the net input of the neuron, the output of the neuron is determined.

A neuron may also have a bias input, which is a constant offset input, which also may have a corresponding weight. If the bias inputs are $b_{zk}$ and $b_{yj}$, respectively for the output and hidden layers, then the net inputs $\omega_k$ and $\psi_j$ to an output layer neuron and a hidden layer neuron, respectively, are:

$$\omega_k = \sum_j w_{kj} y_j + b_{zk} \qquad (1)$$

$$\psi_j = \sum_i w_{ji} x_i + b_{uj} \qquad (2)$$

To train a neural network to process information, a number of pairs of inputs $x_1, \ldots x_i, \ldots x_I$ and corresponding expected outputs (targets) $z_1^\circ, \ldots, z_k^\circ, \ldots z_K^\circ$, corresponding to each output neuron, are prepared. The set of pairs of target outputs and known inputs constitute training data. The actual output zk of an output neuron k as a result of an applied input is compared to the target output z°k, corresponding to the applied input, by a comparator $C_k$ to obtain an output error $e_k$. The output error is generally the difference between the target output and the actual output. Thus, the error $e_k$ in an output layer neuron $z_k$ is simply:

$$e_k = z_k^\circ - z_k \qquad (3)$$

The error $e_j$ in a hidden layer neuron $z_k$ is obtained by backpropagating the output error along the corresponding feedforward paths and is:

$$e_j = \sum_k w_{kj} e_k \cdot f'(\omega_k) \qquad (4)$$

Based on the errors obtained, the connection weights in the network are adapted so as to minimize the error $e_k$ for all output neurons. In a conventional three-layer perceptron (FIG. 1), connection weights are typically adapted by steepest descent using the generalized delta rule (a well-known method, described, for example in Rumelhart, D. E., Hinton, G. E., and Williams R. J., "Learning internal representations by error propagation," *Parallel Distributed Processing: Explorations in the Microstructure of Cognition*. Vol. 1 (eds. Rumelhart, D. E., McClelland, J. L. and the PDP Research Group) pp. 318–362, MIT Press, Cambridge, Mass., 1986).

For the output layer neurons, the connection weight $w_{kj}$ for the synapse connecting the jth hidden layer neuron to the kth output layer neuron is adjusted by adding a value $\Delta w_{kj}$ defined by the following.

$$\Delta w_{kj} = \eta_z e_k y_j f'(\omega_k) \qquad (5)$$

where f' is the slope of the activation function, $\omega_k$ is the net input to the output layer neuron as defined above, $e_k$ is the error as defined above, $\eta_z$ is the learning rate, and $y_j$ is the net input to the hidden layer.

For the hidden layer neurons, the connection weight $w_{ji}$ for the synapse connecting the ith input layer neuron to the jth hidden layer neuron is adjusted by adding a value $\Delta w_{ji}$, defined by the following:

$$\Delta w_{ji} = \eta_y e_j x_i f'(\psi_j) \qquad (6)$$

where $\psi$ is the net input to the hidden layer neuron as defined above, $\eta_y$ is the learning rate, $e_j$ is the error as defined above, and $x_i$ is the net input the input layer neuron.

As is evident from Equations 6 and 4, adaptation of the hidden layer neurons is based on a weighted sum of all output errors, because each hidden layer neuron drives many output neurons. Thus, backpropagation does not scale well, for large numbers of output neurons, and may fail or become prohibitive for large problems. Further, the error signal is therefore highly non-specific and contributes to crosstalk interference. That is, the backpropagated errors from different output layer neurons often happen to nullify one another making it difficult for neurons to adapt optimally.

Another problem caused by the requirement that each hidden layer neuron drive many output layer neurons is that the probability of convergence to local minima multiplies as the number of output layer neurons increases. (A local minimum is reached where the connection weights for synapses between the hidden layer neurons and output layer neurons cease to adapt over one training epoch even when there are nonzero output errors.) Let $P_k$ be the probability that the kth output layer neuron becomes trapped in a local minimum during any training session and $q_k=1-p_k$ be the corresponding probability that a global minimum can be reached. For a multilayer network with K output layer neurons the probability that any or all of the output layer neurons are trapped in local minima is $1-\Pi_I^k q_k$. For large K this probability tends to unity even if a global minimum does exist.

One way to avoid or to overcome the problem of local minima is to repeat the training process many times with randomly assigned initial values for the connection weights. Another, more elegant, approach is to employ a method called simulated annealing, which introduces some randomness into the adaptation, along with the gradient descent. Both approaches are computationally costly, requiring many repetitions, and in general do not guarantee global convergence.

Even in the absence of local minima, convergence of training using backpropagation may tend to be slow because of stationary points, i.e., when all neurons are in a range where the slope of the activation function f, i.e., f', is close to zero. In this event, adaptation is very slow even in the presence of large output errors.

Another problem with the backpropagation method, from a biological standpoint, is that it does not represent a plausible neural learning method because it cannot be implemented by realistic neurons. This follows from Equation 4, which requires that the output errors can be backpropagated (in retrograde) to the hidden layer neurons, each output error being weighted by the connection weights $w_{kj}$ along the same connection paths, thus requiring the hidden layer neurons to know the synaptic transmissibility downstream—a biologically implausible event. Furthermore, the variations in the backpropagated errors to different hidden layer neurons imply the existence of an extensive recurrent feedback structure that is absent in most nervous systems.

An electronic neuron faces the same physical limitations as does a biological neuron; for example, the connection weights are inaccessible downstream in the feedforward path. Consequently, the backpropagation method cannot be readily implemented, especially in a large-scale network, by electronic means, e.g., using analog or digital very large scale integrated (VLSI) circuits. Although some parallel feedback paths theoretically can be added to relay the connection weights, the resulting electronic architecture is often impractical for large networks. Thus, it is more common to implement the backpropagation method numerically on digital computers.

There are other learning rules which may be used and that are biologically more realistic than backpropagation. For example, there is the adaptive reward-penalty ($A_{r-p}$) learning rule of Barto and Jordan. (Barto, A. G. and Jordan, M. I., "Gradient following without backpropagation in layered networks," *Proc. IEEE First Annual International Conference on Neural Networks*, Vol. II: 629–636, San Diego, Calif., 1987). With this method a single reinforcement signal is broadcast to all neurons but the error is the average of all output errors and is therefore nonspecific for the purpose of training each output layer neuron and hidden layer neuron. However, the $A_{r-p}$ method generally converges more slowly than the backpropagation method. This and other methods may also require highly specialized neural connections for their implementation.

Training a multilayer network with backpropagation and other methods is often a cumbersome task that may not always be practicable. Although one of the most celebrated advantages of neural networks is the parallel distributed processing capability which enables fast computation during performance, this parallelism has yet to be used to enhance training.

SUMMARY OF THE INVENTION

Problems with prior art systems are overcome by the invention by placing constraints on the structure of the conventional multi-layer network which consequently enable the learning rules to be simplified and the probability of reaching only local minima to be reduced. Further, the structure is biologically plausible and can therefore facilitate the implementation of large scale network by an electronic means. The resulting structure also allows parallel training of parts of the neural network. The first constraint is that neurons in the hidden layer of the neural network are functionally specific, i.e., either inhibitory or excitatory. Another constraint is that for each neuron in the hidden layer, there is at most one synapse connecting it to a corresponding neuron in the output layer. The result is a tree-like neural network.

Accordingly, one aspect of the present invention is a neural network in accordance with the invention is tree-like and has an input layer comprising a plurality of neurons, a hidden layer comprising a plurality of neurons, each neuron being either inhibitory or excitatory, and an output layer comprising at least one neuron. Each synapse in a first set of synapses connects a neuron in the input layer to a neuron in the hidden layer. Each synapse in a second set of synapses connects a neuron in the hidden layer to a neuron in the output layer. There is at most one synapse connecting a neuron in the hidden layer to a corresponding neuron in the output layer. With a plurality of output neurons, a plurality of parallel output paths is thus created. Also, there may be multiple hidden layers, wherein each layer has a plurality of neurons, and wherein each neuron in any anterior layer (closer to the input layer) connects to only one neuron in any posterior layer (closer to the output layer). Each neuron in a hidden layer receives a reinforcement signal from the neuron in the output layer to which it is connected by a feedforward path.

Another aspect of the invention is a method for training such a neural network includes the steps of: (a) preparing a set of training data pairs, each training data pair comprising an input and a corresponding desired output; (b) applying an input of a selected training data pair to the input layer of the neural network; (c) obtaining an actual output from each neuron of the output layer of the neural network; (d) comparing the actual output to the desired output of the selected training data pair to obtain an error signal having a polarity for each neuron of the output layer; and (e) for each neuron in the hidden and output layers, adjusting the weight of the synapse connected anterior to the neuron i) with a polarity opposite the polarity of the error signal when the polarity determined for the path for the neuron is inhibitory and ii) with the polarity of the error signal when the polarity determined for the path for the neuron is excitatory.

DETAILED DESCRIPTION

The present invention will be more completely understood through the following detailed description which should be read in conjunction with the attached drawing in which similar reference numbers indicate similar structures. All references cited herein are hereby expressly incorporated by reference.

The present invention involves placing constraints on the structure of the conventional multilayer network which consequently enable the learning rules to be simplified and the probability of reaching only local minima to be reduced. Further, the structure is biologically plausible and can therefore facilitate the implementation of large scale networks by electronic means. The resulting structure is also for parallel training of parts of the network.

Figure 1:
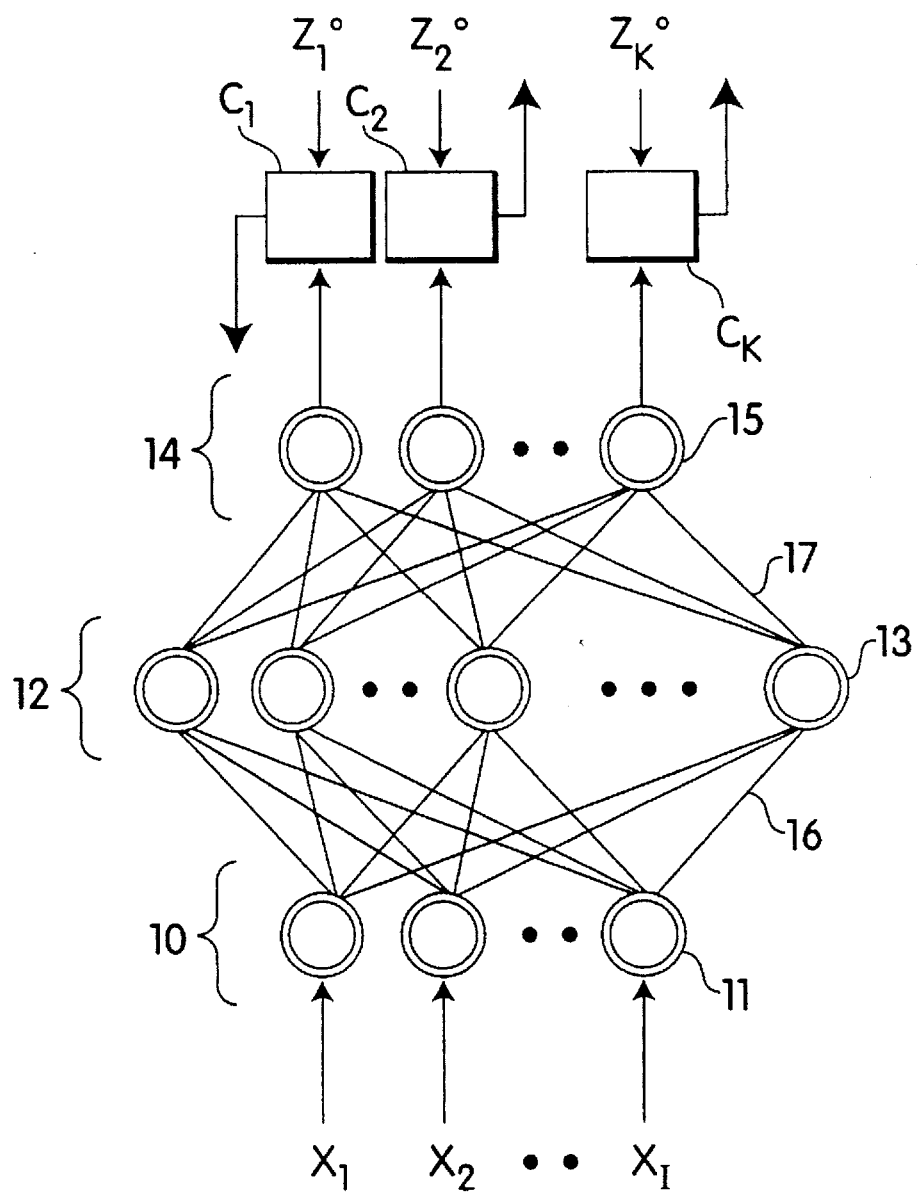
FIG. 1 is a diagrammatic representation of a conventional multilayer neural network.
Figure 2A:
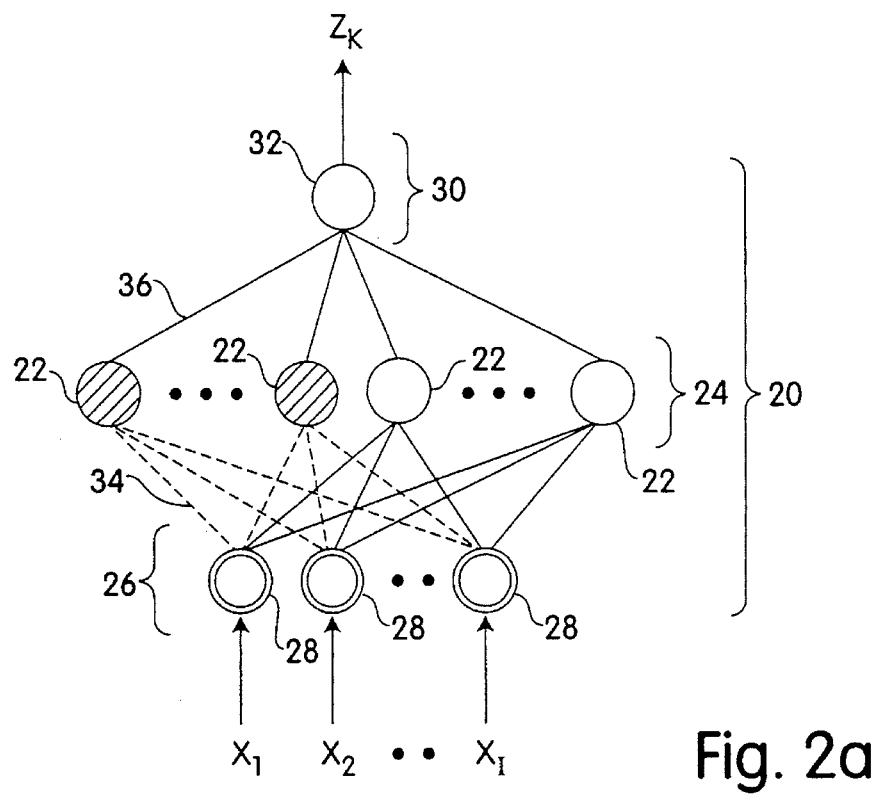
FIG. 2a is a diagrammatic representation of a neural network with a single output neuron in accordance with the present invention.
Figure 2B:
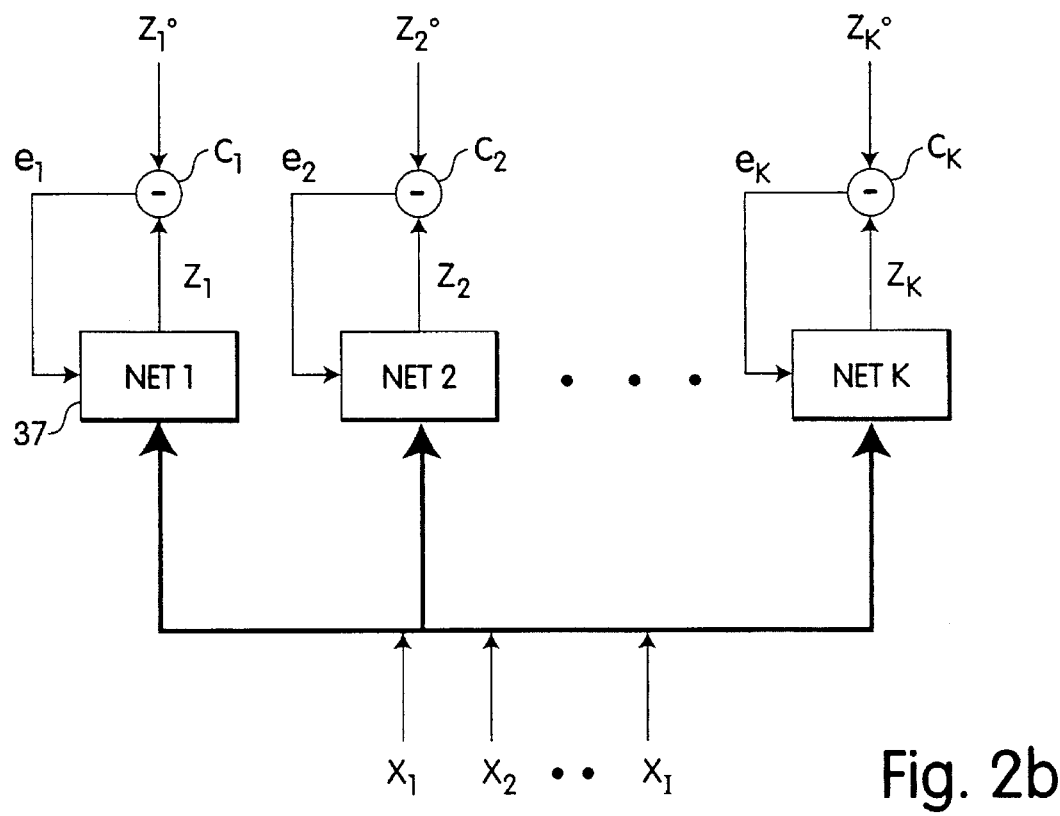
FIG. 2b is a diagrammatic representation of a neural network with multiple output neurons in accordance with the present invention.
Figure 2C:
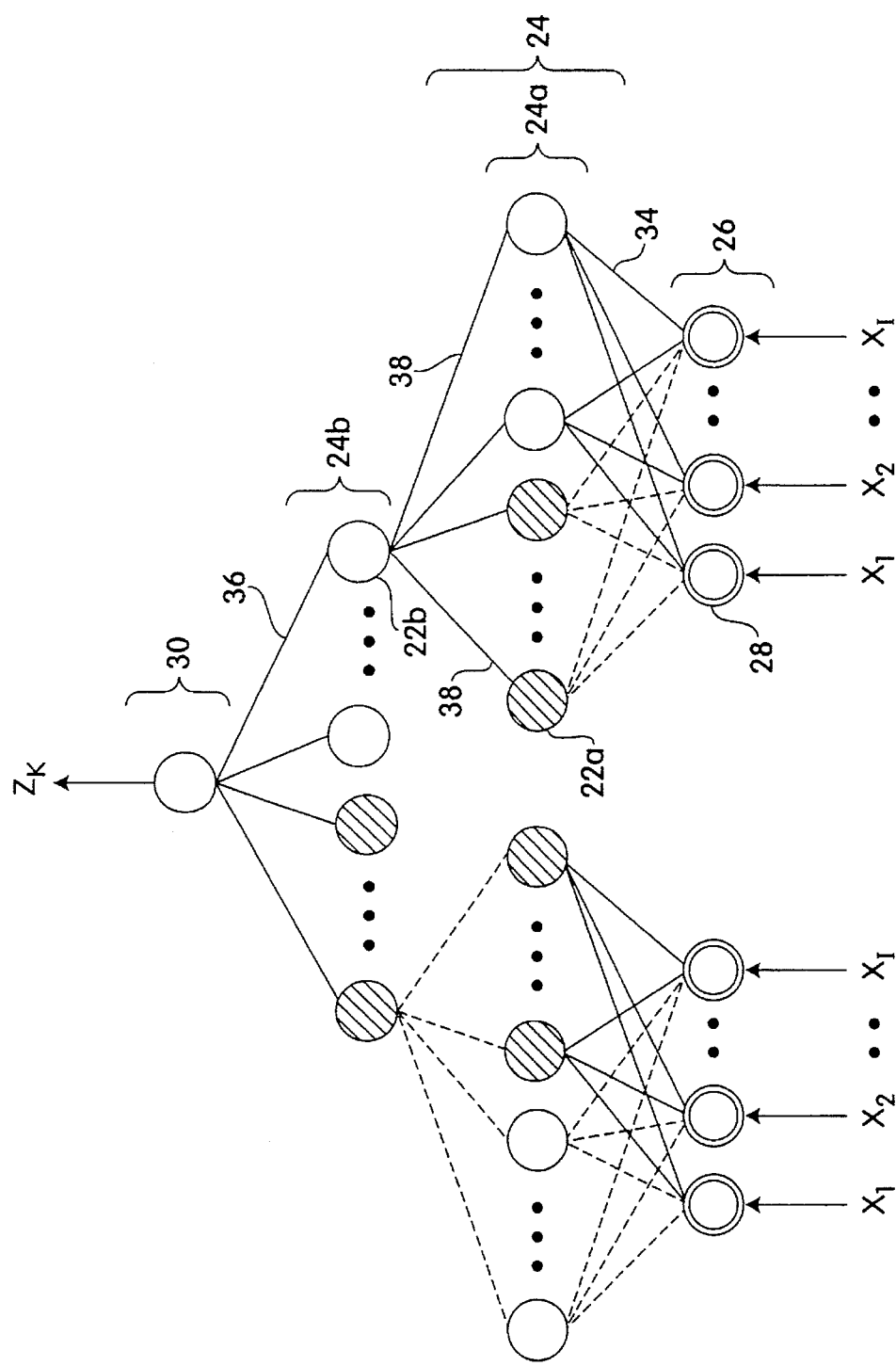
FIG. 2c is a diagrammatic representation of a neural network with multiple hidden layers in accordance with the present invention.

FIGS. 2a, 2b, and 2c show the structure of tree-like perceptrons in accordance with the present invention. FIG. 2a shows a multi-input, single-output, three-layer network 20. The hidden layer 24 is comprised of neurons 22 which are functionally specific. That is, a neuron in the hidden layer is either inhibitory (identified by closed circles) if the connection weight for the posterior synapse is constrained to be always negative, or excitatory (identified by open circles) if the connection weight is constrained to be always positive. The input layer 26 and output layer 30 include neurons 28 and 32 respectively which may be bipolar, inhibitory or excitatory. As with the conventional multilayer network, synapses 34 connect neurons in the input layer to neurons in the hidden layer. Synapses 36 connect neurons 22 in the hidden layer 24 to neurons 32 in the output layer 30. However, another constraint is that for each neuron in the hidden layer, there is at most one synapse connecting it to a corresponding neuron in the output layer. A consequence of this constraint is that a multioutput network, as shown in FIG. 2b, has a parallel division of the output paths into separate subnets 37, each of which is similar to a single output network as shown in FIGS. 2a or 2c. The error signal $e_k$ from comparator $c_k$ for any output neuron k is fed back only to the subnet 37 for that output neuron.

FIG. 2c shows a single output network with multiple hidden layers 24a (the anterior layer) and 24b (the posterior layer) which illustrates a further constraint that any neuron 22a in the anterior layer 24a can be connected by a synapse 38 to at most one neuron 22b in the posterior layer 24b.

A tree-like network as shown in FIGS. 2a, 2b and 2c network is trained with locally enforced learning rules. For multiple output networks, adaptation preferably occurs after presentation of each training pattern.

For such a network the learning process can be understood as a modification to Equation (6) which becomes:

$$\Delta w_{ji} = \eta(w_{kj}, y_j, z_k) \cdot x_i e_k \tag{7}$$

where $$\eta(w_{kj}, y_k, z_k) \equiv \eta \cdot w_{kj} f'(\omega_j) f'(\psi_k)$$

is a state-dependent learning rate that varies with different hidden layer neurons during training. Convergence of gradient descent is independent of the magnitude of the learning rate as long as the latter is sufficiently small; however, the learning rate may be replaced with a constant to rewrite Equation (7) as $$\Delta w_{ji} = sgn(w_{kj}) \eta_y \cdot x_i e_k \tag{8}$$

Equation (8) results in a gradient descent with a fixed step size, although not necessarily in the steepest direction. Equation (8) can be enforced locally at each hidden layer neuron provided that the error signal $e_k$ is fed to all hidden layer neurons and that the sign of $w_{kj}$ is known. The latter is possible because each hidden layer neuron is functionally prespecified to be either excitatory or inhibitory so that $w_{kj}$ can only be either positive or negative (but not both).

For networks with more than one hidden layer (e.g., FIG. 2c) the local learning rules are preserved by successive branching of all neurons from the posterior to anterior end of the network, forming a tree-like structure (i.e., no neuron in an anterior layer is connected to more than one neuron in a posterior layer). That is, along with the error signal and net polarity, only information local to the neuron, i.e., the learning rate and the net input, are required to adjust the connection weight. For networks with multiple hidden layers, j1 (posterior layer) and j2 (anterior layer), to adjust the weight $w_{j_1 j_2}$, the value of $sgn(w_{kj})$ in equation 8 is replaced by the product: $sgn(w_{kj_1}) \cdot sgn(w_{j_1 j_2})$.

As should be evident from the above, the adaptation of weights depends on the net polarity of all synaptic connections in the unique feedforward path between a selected hidden layer neuron and the output layer neuron to which it connects. The net polarity is prespecified by the network morphology. That is, for any given neuron, its polarity is negative (inhibitory) if there is an odd number of negative polarity (inhibitory) neurons from it to the output neuron (but excluding the output neuron). Otherwise, its polarity is positive (excitatory). Because the hidden layer neurons are constrained to be either excitatory or inhibitory, the direction of change of the connection weight of the synapse connected anterior to the neuron in response to the error signal is known. In particular, when the net polarity for the path for a neuron is determined to be inhibitory, the weight of the synapse connected anterior to the neuron is adjusted according to a polarity which is the opposite of the polarity of the error signal. When the net polarity of the path for the neuron is determined to be excitory, the weight of the synapse connected anterior to the neuron is adjusted with the polarity of the error signal.

If the synapse for which the weight is adjusted is excitatory, and the magnitude of the change required by the learning equations would render the weight inhibitory, the weight is set to zero. Similarly, if the synapse is inhibitory, and the change renders the weight excitatory, the weight is set to zero.

The adaptive rule (Equation 8) for the neurons in the hidden layer is independent of the slope of the activation function of those neurons because of the elimination of the f' term. Thus, in an electrical implementation, a multiplier for this purpose, which is needed for implementation of conventional networks, can be eliminated. In addition, the new rule differs from the conventional backpropagation rule in one significant aspect: it does not require backpropagation of connection weights. This simplification is possible because only one output error ($e_k$) is backpropagated along the feedforward path for each subnet; thus the backpropagated error is affected by only one connection weight instead of multiple connection weights. In particular, the errors at the hidden layer neurons are always directly proportional to the output error, the proportionality constants being given by the corresponding connection weights. The magnitude of the connection weight can be absorbed into the learning rate for the hidden layer neuron. To compute the error gradients at any hidden layer neuron, therefore, only the polarity of the connection weight between the hidden layer neuron and the output layer neuron (or the net polarity of the path to the output neuron) needs to be known and is actually prespecified by the network morphology.

To adjust the weights between the hidden layer and output layer, Equation (5) is also simplified by substituting a constant term $\eta_z$ for the product $\eta f'(\psi_k)$, giving $$\Delta w_{kj} = \eta_z \cdot y_i e_k \quad (9)$$

Equation (9) is similar to the adaptive rule for the output layer neurons in the conventional multilayer perceptron (Equation 5) except that the slope f' of the activation function is omitted. For monotone increasing activation functions, f' is always positive and can be absorbed into the learning rate constant $\eta_z$. This also helps to avoid the problem of stationary points. Although the resulting gradient descent is not in the steepest direction, it tends to step over any plateau caused by the nonlinearity of the activation function.

For multi-output networks (FIG. 2b), each output neuron is driven by a separate subnet 37 of the same basic tree structure as in FIG. 2a but with independent hidden layer neurons. Each subnet is trained independently and thus may be trained in parallel by the same local learning rules (Eqs. 8,9). Each subnet also has a uniformly disseminated error signal that is specific to it, thus precluding any crosstalk.

Convergence speed of training of such networks is determined by the maximum time required to train any single-output subnet and should always exceed that for equivalent multi-output networks. For a given multi-output network, a tree-like network is shown to converge faster than does a conventional one. As K increases the convergence speed of a tree-like network remains unchanged whereas that for a conventional network deteriorates rapidly. For large K the difference in convergence speed (to global minima) is more than K times the nominal value while the incidence of local minima for a conventional network rises dramatically (see FIGS. 3a and 3b).

Figure 3A:
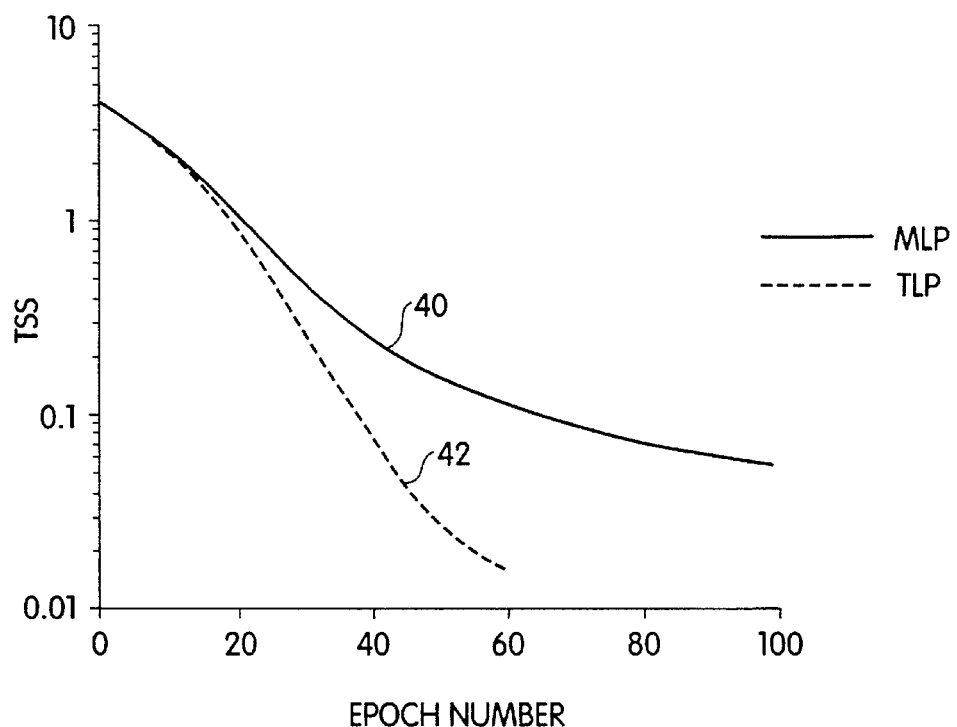
FIG. 3a is a graph of the total sum of square error with respect to the number of epochs of training for both conventional and tree-like networks.
Figure 3B:
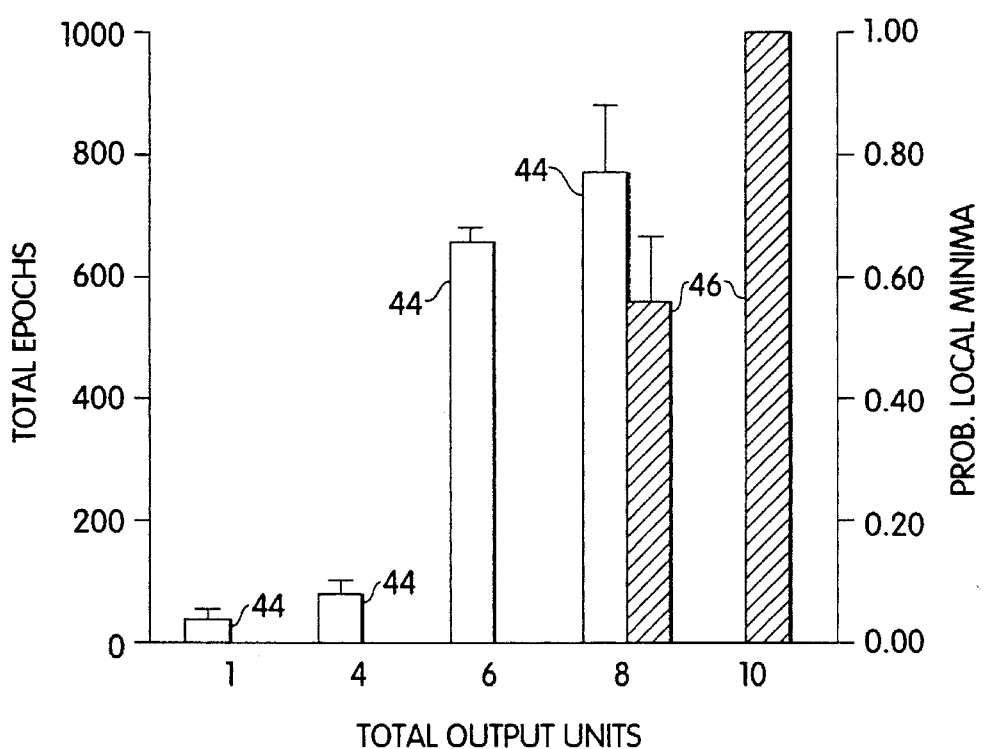
FIG. 3b is a bar graph of the probability of a network becoming trapped in a local minimum given a number of output neurons and the number of epochs of training.

FIGS. 3a and 3b provide examples for comparing the convergence characteristics of multilayer networks and those of the present invention. FIG. 3a shows learning curves 40 and 42 for a three-layer network with four input layer neurons, two hidden layer neurons and four output layer neurons. The training set consisted of four serial input patterns (0–3) and binary targets representing the square of the corresponding inputs. The conventional multilayer network (learning curve 40) was trained by using multi-output error backpropagation with a learning rate of 0.5. For the tree-like network (learning curve 42), the output subnets were trained independently of one another in parallel; for ease of comparison a single-output backpropagation algorithm with the same learning rate was used, giving a variable-step tree-like perceptron training with a similar step size as for the multilayer perceptron. The connection weights in both cases were initialized randomly between (–0.5, 0.5) giving a relatively large initial total sum of square error (TSS) over all output patterns. Each curve 40, 42 represents the average of 10 training sessions with different randomly assigned initial weights. For small number of training epochs (i.e., less than 20) both networks converged at similar rates. As training continued, however, the tree-like network learned to perfection more rapidly than did the conventional network. At a critical TSS level of 0.04 (0.01 per output unit) the tree-like network converged in less than half the number of training epochs required for the conventional network.

In FIG. 3b open bars 44 show the total number of training epochs for the above networks to reach the same critical level per output layer neuron. The tree-like network, assuming that all of its subnets are trained in parallel, always converges in the time it takes for one output neuron to converge. In contrast, the conventional multilayer network does not permit parallel training, thus, an increase in the number of output neurons increases the time for convergence and the probability of encountering local minima. The corresponding fraction of training sessions ending with local minima is shown by filled bars 46. Note that when the total number of output neurons was 10, all training sessions ended in local minima. In this example the training patterns in each case were chosen such that for each input pattern only half of the targets were on (worst case). Each training session was repeated 30 times or until a total of 10 sessions that converged to global minimum had been encountered. For conventional networks where the number k of output neurons was greater than six, the convergence time was more than K parallel single-output subnets. For conventional networks where K was greater than eight the percentage of incidence of local minima increased dramatically, approaching 100% where K was equal to ten.

The tree-like neural architecture in accordance with the invention circumvents some previous criticisms of the conventional network as a model of biological information processing. The learning rules can be enforced locally with no backpropagation of information (other than output errors) thus avoiding ambiguities in the error signal. Further, the error feedbacks are uniformly disseminated to all neurons within each parallel structure without the need for any complex transformations. Because learning in separate subnets contributes to reduction of errors for only one output neuron, if a local minimum is reached at any output neuron, only the subnet connected to that output neuron, and not the whole network, need be retrained. Therefore, for each retraining, the probability that the neural network will be trapped in a local minima is reduced if any one output neuron converges.

In such tree-like networks, biological realizability and efficient learning are accomplished at the expense of a multiplication of the number of neurons. In practice, this should not be a significant limitation since most computations can be carried out with conventional networks having no more than two hidden layers. Furthermore, the parallel architecture of the tree-like network permits efficient simulation of both training and processing on existing parallel computers. The use of local learning rules without backpropagation also simplifies silicon implementations of multilayer networks on digital and analog very-large-scale-integrated (VLSI) circuits.

A neural network in accordance with the invention may be implemented in both analog and digital (VLSI) circuits, and in both parallel and serial digital computers. An embodiment of the invention, suitable for analog or digital VLSI, will now be described, in connection with block diagram of FIG. 4.

Figure 4:
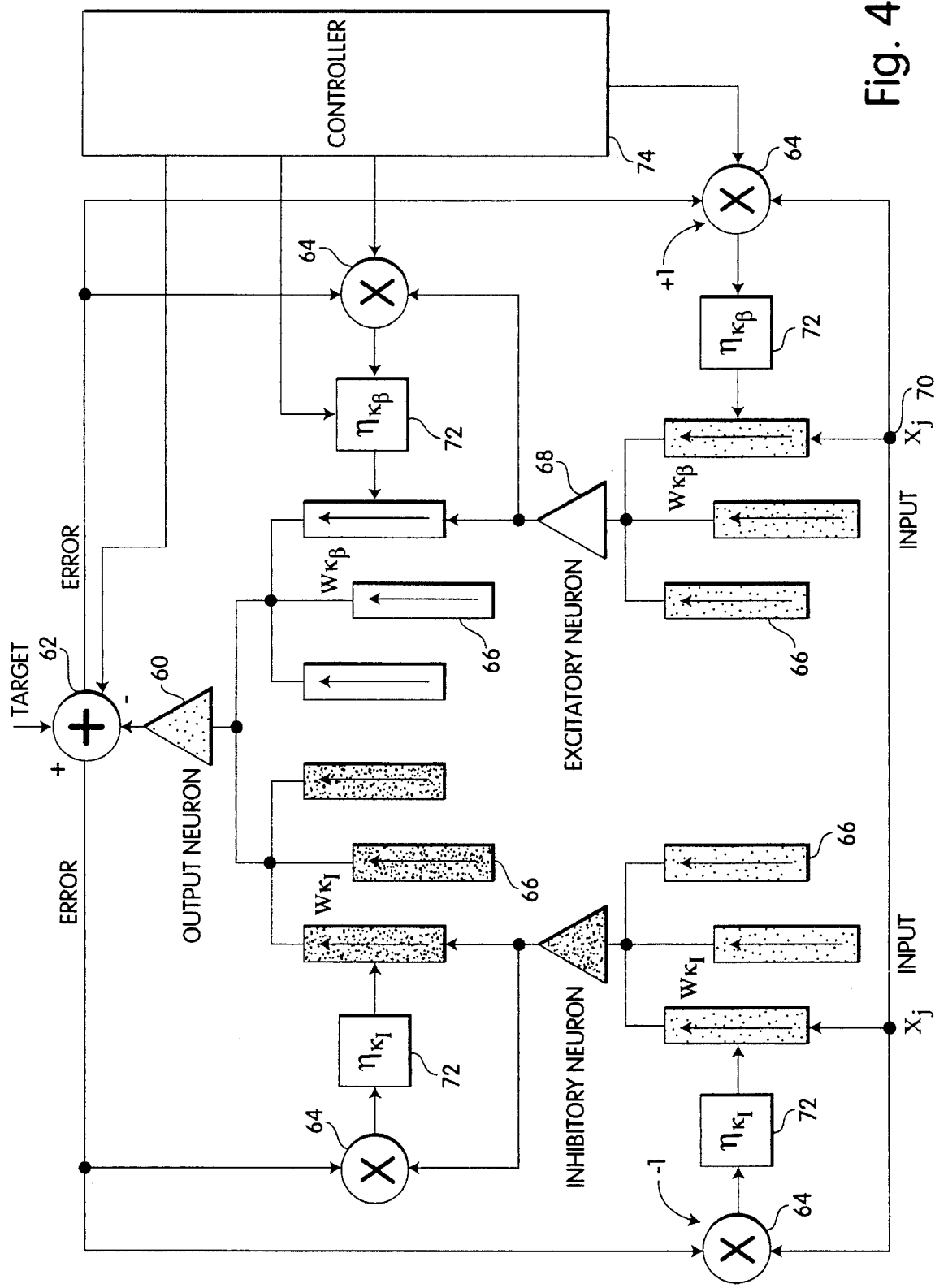
FIG. 4 is a block diagram of a circuit for digital or analog VLSI implementation of a network in accordance with the invention.

A single output subnet is shown in FIG. 4 where the output of an output neuron 60 is fed to a comparator 62 which calculates the difference between the output and the target output for the given output neuron 60. The resulting single error is fed to multipliers 64 which are provided either in parallel for each synapse 66 or which are multiplexed for all synapses of a given neuron 68 in the hidden layer or 70 in the input layer. The multiplier 64 multiplies the error by the net input to the corresponding neuron and by the polarity of the path downstream from the neuron in the feedforward path. The multipliers 64 for the hidden layer neurons 68 have no sign as they are connected to the output neuron which in this example in bipolar. The output of the multiplier 64 is scaled by the learning rate for the corresponding neuron by multipliers 72 which in turn adjust the weights stored for each synapses 66.

For a digital implementation the connection weight for a synapse 66 is stored in a register assigned to the synapse. Arithmetic operations are performed using digital arithmetic units. That is, adding, multiplying and inner products are performed in digital hardware using commonly available components. The neurons, which are nonlinear elements, are implemented as an analog function or as a lookup table for example by using an erasable programmable read-only memory (EPROM), or other memory device. A synchronous controller 74 schedules relaxation and learning intervals. The controller is preferably implemented as a micro-coded program in an EPROM. Weights may be updated either simultaneously (which requires more hardware) or serially (which allows multiplexing of multipliers). Examples of digital implementations of conventional networks, which may be modified to implement the present invention are described in Kashai, Yaron and Be'ery, Yair, "Comparing digital neural network architectures", *Silicon Architectures For Neural Nets*, Sami, M. and Calzadilla-Daguerre, J. (eds.), Elsevier Science Publishers B. V. (North Holland), pp. 45–63, 1991, and Ouali, J. em et al., "Distributed large neural networks on silicon", *Silicon Architectures For Neural Nets*, Sami, M. and Calzadilla-Daguerre, J. (eds.), Elsevier Science Publishes B. V. (North-Holland), pp. 11–29, 1991. The modifications required are 1) enforcement of the structural constraints identified above and 2) elimination of unnecessary computational hardware in accordance with the modifications made to obtain the learning equations 8 and 9 above.

For an analog implementation, the arithmetic operations are handled through operational amplifiers and analog multipliers. Circuits which perform an inner product for synapse calculation are also available. Storing the connection weights of the network may be performed with digital memory circuits with digital-to-analog converters, floating-gate memory (EEPROM technology) and CMOS memory cells. Analog memory requires external refresh from a digital source and thus a refresh controller is necessary as part of the controller 74. The neurons themselves also have many implementations. The nonlinear sigmoidal function has been extensively studied and circuits for realizing this function are available. As with the digital implementation a controller 74 schedules relaxation and learning intervals. However, unlike the controller for the digital VLSI implementation, the controller for an analog implementation is implemented in a microcoded form. It is also possible to implement the learning method off-chip and have controller circuitry to download the connection weights from a host computer.

Examples of analog implementations of conventional networks, which may be modified to practice the present invention, include: Graf, Hans P. et al., "VLSI Implementation of a Neural Network Model", *IEEE Computer*, March 1988; Jabri, Marwan and Flower, Barry, "Weight Perturbation: An Optimal Architecture and Learning Technique for Analogue Feedforward and Recurrent Multilayer Networks", *Neural Computation* 3, 546–565 (1991); and Caviglia, Daniele D. et al., "A CMOS Analogue Architecture for Adaptative Neural Networks", *Silicon Architectures For Neural Nets*, Sami, M. and Calzadilla-Daguerre, J. (eds.), Elsevier Science Publishers B. V. (North-Holland), pp. 113–123, 1991. Modifications to be made are similar to the modifications to the conventional digital VLSI systems.

An embodiment of the invention, suitable for serial digital computers, will now be described. The inventors have implemented this system on both a SPARCstation computer, manufactured by Sun Microsystems, Inc. and the XMP computer manufactured by Cray Systems, Inc. The Aspirin/MIGRAINES system, release 6.0, available as "freeware" from Russell Leighton and the MITRE Corporation was used to generate programs in the ANSI 'C' programming language which simulate conventional multilayered neural networks trained using backpropagation training. These programs were then modified in accordance with the learning rules and other constraints on the network structure described above in order to simulate neural networks in accordance with the invention. The modified 'C' programs are then compiled to operate on the respective machines. A sample program for each of the conventional and tree-like networks is found respectively, in Appendix A and Appendix B. The differences between these two programs as determined by the UNIX command "diff" are the following:

After line 12, the following line 13 is found only in the modified program (Appendix B):

```
> #define sgn(x)((x < 0)? -1.0:((x > 0)? 1.0:0.0)
    After line 120, the following lines 122-124 are found only
in the modified program (Appendix B)
> float tempWeights[2];
> int i;
>
    Line 139 of the original program (Appendix A) is the
following:
< BPaccum_weights_from_hidden
    (b0_10_c, b0_11_v+0,b0_11_c+0,b0_
    Output_Layer1,b0_Output_Layer1ac, 1,2,2);
and is replaced by the following lines 143-148 in the modified
program (Appendix B).
> for (i=0; i < 2; i++)
> (
> tempWeights[i] = sgn(*(float *)(&b0_Output_Layer1[i]));
> }
>
> BPaccum_weights_from_hidden
    (b0_10_c, b0_10_c, b0_11_v+0,
    b0_11_c+0,tempWeights,b0_Output_Layer1ac, 1,2,2);
```

More details as to how the Aspirin/MIGRAINES neural network software may be used to generate conventional multilayer neural networks is provided in the user's manual for release 6.0 of that software, dated Oct. 29, 1992, and available from the MITRE Corporation of Bedford, Mass., document number MP-91W00050.

An embodiment of the invention, suitable for implementation on a single instruction multiple data (SIMD) parallel computer will now be described. Such an implementation for a conventional multilayer neural network has been described in Lin, Wei-Ming et al., "Algorithmic Mapping of Neural Network Models onto Parallel SIMD Machines", *IEEE Transactions on Computers,* Vol. 40, No. 12, pp. 1390–1401, 1991. This reference provides pseudocode for data routing requirements of the backpropagation method. This implementation is modified in a manner similar to the modification of the 'C' programs listed in the Appendix and as described above. In this method, there is a derivative term in the calculation of an error term $\delta$. A matrix A represents the connection weights. Thus, the product $A\delta$ required for backpropagation should become $SGN(A)\delta$, where $SGN(A)$ denotes the element-by-element application of the $SGN()$ function to the elements of A. To be complete, the processors in the SIMD parallel computer must have sufficient computational capability to perform the $SGN()$ function in addition to those already stated in the above-identified reference.

An implementation on data flow computers will now be described. An implementation for a conventional multi-layer network on data flow computers is described in Kim, S. T. et al., "Algorithmic Transformations for Neural Computing and Performance of Supervised Learning on a Dataflow Machine", *IEEE Transactions on Software Engineering,* Vol. 18, No. 7, pp. 613–623, 1992. In this reference, an implementation of the backpropagation method is given in the Id dataflow language. To implement the present invention, the method disclosed in that reference is modified in a manner similar to modifications to other systems discussed above. Namely the derivative factor is removed from the learning equations, and the WEIGHT factor representing the connection weight in the calculation of the error is changed to SGN(WEIGHT). Both of these modifications are made to the "PERR" routine described in the above-identified reference.

Another implementation of the invention suitable for systolic arrays will now be described. An implementation for a conventional multilayer network using systolic arrays and using the backpropagation learning method is described in "A VLSI Systolic Array Architecture for Multilayer Perceptrons", M. Eng. Sc. (Research) Thesis by Paul Murtaugh, 1992, University of Queensland. In this reference, a prose description of the implementation of the backpropagation is provided. An error term $\delta_i(L)$ is calculated for each neuron in the output layer. This calculation is modified to eliminate the derivative of the activation functions of the neurons, and the weight factor ($\omega_{ji}^{(m-1)}$) used in this calculation is changed to $SGN(\omega_{ji}^{(m-1)})$.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

```c
/* You may want to run this thru 'cb' or 'indent' */

/** Back-propagation simulation for parity.aspirin **/ include "aspirin_bp.h"

include "BpSim.h"

/* GLOBAL VARIABLES */
float           BPlearning_rate = 0.2;
float           BPinertia = 0.95;
static float    init_range = 0.1; /* feedforward weights */
static float    ar_init_range = 0.001; /* autogressive feedback weights */
static long     init_seed = 123;

char            error_string[E_STRING_SIZE]; /* describes current error */

/* Connection Buffer for interconnect data */
static CB       connection_buffer[2];

/* Communication Buffer */
static LB       comms_buffer;

/* NETWORK DATA */
#ifndef PADDING
# define PADDING 0
#endif
static float    network_data[36 + PADDING];

/* data for parity */
```

```
static unsigned int b0fcounter = 0; /* # times fwd */
static unsigned int b0bcounter = 0; /* # times bkwd */

/* parity:Hidden_Layer */
extern float
regularSigmoid (float x); /* user's transfer function */
extern float
regularSigmoidPrime (float x); /* user's derivative of transfer */
#define b0_l1_n (network_data + 0) /* net inputs */
#define b0_l1_v (network_data + 2) /* values */
#define b0_l1_t (network_data + 9) /* thresholds */
#define b0_l1_ac (network_data + 11) /* accumulated changes */
#define b0_l1_dt (network_data + 13) /* delta thresholds */
#define b0_l1_c (network_data + 4) /* credit */

/* parity:Output_Layer */
extern float
regularSigmoid (float x); /* user's transfer function */
extern float
regularSigmoidPrime (float x); /* user's derivative of transfer */
#define b0_l0_n (network_data + 6) /* net inputs */
#define b0_l0_v (network_data + 7) /* values */
#define b0_l0_t (network_data + 15) /* thresholds */
#define b0_l0_ac (network_data + 16) /* accumulated changes */
#define b0_l0_dt (network_data + 17) /* delta thresholds */
define b0_l0_c (network_data + 8) /* credit */ static float   *b0_input_vector = (float *) NULL; /* input vector */ define b0_input_vector0 b0_input_vector /* input vector */ static float   *b0_target_output = (float *) NULL; /* desired output */

/* parity:Hidden_Layer input connections */
#define b0_Hidden_Layer2 (network_data + 18) /* weights from $INPUTS */
#define b0_Hidden_Layer2ac (network_data + 22) /* accumulated changes */
#define b0_Hidden_Layer2d (network_data + 26) /* delta weights */
```

```
/* parity:Output_Layer input connections */
#define b0_Output_Layer1 (network_data + 30) /* weights from
 * parity:Hidden_Layer */
#define b0_Output_Layer1ac (network_data + 32) /* accumulated changes */
#define b0_Output_Layer1d (network_data + 34) /* delta weights */

/* Black Box Control Functions */

/** parity **/ void
parity_bb_clear_delays ()
{
} /* end parity_bb_clear_delays */

/* parity Forward Propagation */
void
parity_propagate_forward ()
{

/* --------------- parity:Hidden_Layer --------------- */
    /* Connection to parity:Hidden_Layer from $INPUTS */
    BPlvdot (b0_Hidden_Layer2, b0_input_vector + 0, 2, b0_l1_v, 2, 2);
    /* calculate the transfer function for parity:Hidden_Layer */
    BPuser (b0_l1_v, b0_l1_n, b0_l1_t, 2, regularSigmoid);

/* --------------- parity:Output_Layer --------------- */
    /* Connection to parity:Output_Layer from parity:Hidden_Layer */
    BPlvdot (b0_Output_Layer1, b0_l1_v + 0, 2, b0_l0_v, 2, 1);
    /* calculate the transfer function for parity:Output_Layer */
    BPuser (b0_l0_v, b0_l0_n, b0_l0_t, 1, regularSigmoid);

b0fcounter++; /* increment fwd counter */
} /* end parity_ propagate_forward */
```

```
/***************** parity Error *****************/
float
parity_calc_error ()
{
    float           error;
    /*** parity:Output_Layer ***/
    /* Calc diff between output and target output */
    /* Modulate by learning rate times 1/(update_interval) */
    error = BPoutput_error (b0_target_output, b0_10_v, b0_10_c, BPlearning_rat
    return (error);
} /* end parity_calc_error */

/***************** parity Backward Propagation (Gradient Calc) *************
void
parity_calc_grad ()
{ b0bcounter++; /* increment bwd counter */

/* clear errors */
    bzero ((char *) b0_11_c, 2 * sizeof (float));

/* backprop */

/* calc deriv of function and multiply by credit */
    BPderiv_user (b0_10_n, b0_10_c, 1, regularSigmoidPrime);

/* Accumulate Biases */
    BPaccum_biases (b0_10_ac, b0_10_c, 1);

/* Do all connections into parity:Output_Layer */

/* Connection to parity:Output_Layer from parity:Hidden_Layer */

/* Accumulate weight changes */
    BPaccum_weights_from_hidden (b0_10_c, b0_11_v + 0, b0_11_c + 0, b0_Output_
```

```
    /* calc deriv of function and multiply by credit */
    BPderiv_user (b0_l1_n, b0_l1_c, 2, regularSigmoidPrime);

/* Accumulate Biases */
    BPaccum_biases (b0_l1_ac, b0_l1_c, 2);

/* Do all connections into parity:Hidden_Layer */

/* Connection to parity:Hidden_Layer from $INPUTS */

/* Accumulate weight changes */
    BPaccum_weights_from_input (b0_l1_c, b0_input_vector + 0, b0_Hidden_Layer2
} /* end parity_calc_grad */

/***************** parity Update Weights ******************/
void
parity_update_weights (float scalar)
{

/* update the weights */

/* Upate Biases */
    BPupdate_weights (scalar, b0_l0_ac, b0_l0_t, b0_l0_dt, 1);
    bzero ((char *) b0_l0_ac, 1 * sizeof (float));
    /* Upate Connection from parity:Hidden_Layer to parity:Output_Layer */
    BPupdate_weights (scalar, b0_Output_Layer1ac, b0_Output_Layer1, b0_Output_
    /* Clear Connection from parity:Hidden_Layer to parity:Output_Layer */
    bzero ((char *) b0_Output_Layer1ac, 2 * sizeof (float));

/* Upate Biases */
    BPupdate_weights (scalar, b0_l1_ac, b0_l1_t, b0_l1_dt, 2);
    bzero ((char *) b0_l1_ac, 2 * sizeof (float));
    /* Upate Connection from $INPUTS to parity:Hidden_Layer */
    BPupdate_weights (scalar, b0_Hidden_Layer2ac, b0_Hidden_Layer2, b0_Hidden_
    /* Clear Connection from $INPUTS to parity:Hidden_Layer */
    bzero ((char *) b0_Hidden_Layer2ac, 4 * sizeof (float));
} /* end parity_update_weights */
```

```
/* COUNTER CONTROL */
void
parity_set_backprop_counter (int x)
{
    b0bcounter = x;
} /* end parity_set_backprop_counter */
int
parity_get_backprop_counter ()
{
    return (b0bcounter);
} /* end parity_get_backprop_counter */

/* INPUT CONTROL */
void
parity_set_input (float *vector)
{
    b0_input_vector = vector;
} /* end parity_set_input */ float         *
parity_get_input ()
{
    return (b0_input_vector);
} /* end parity_get_input */

/* TARGET OUTPUT CONTROL */ float         *
parity_get_output ()
{
    return (b0_10_v);
} /* end parity_get_output */ void
parity_set_target_output (float *vector)
{
```

```
        b0_target_output = vector;
} /* end parity_set_target_output */ float           *
parity_get_target_output ()
{
    return (b0_target_output);
} /* end parity_get_target_output */

/* NETWORK FUNCTIONS */

/* parity_error_string: Return string describing error */
char            *
parity_error_string ()
{
    return (error_string);
} /* end parity_error_string */

/* parity_set_learning_rate: Set learning rate */
void
parity_set_learning_rate (float x)
{
    BPlearning_rate = x;
} /* end parity_set_learning_rate */

/* parity_set_inertia: Set inertia */
void
parity_set_inertia (float x)
{
    BPinertia = x;
} /* end parity_set_inertia */

/* parity_get_learning_rate: Return the  learning rate */
float
parity_get_learning_rate ()
{
    return (BPlearning_rate);
```

```c
} /* end parity_get_learning_rate */

/* parity_get_inertia: Return the  inertia */
float
parity_get_inertia ()
{
    return (BPinertia);
} /* end parity_get_inertia */ static
write_header (int fd)
{
    int         number;
    int         n_extra_bytes = 256;
    char        extra_bytes[256];

/* write header */
    number = 100; /* compiler identifier */
    write (fd, &number, sizeof (int));
    number = 6; /* major version */
    write (fd, &number, sizeof (int));
    number = 0; /* minor version */
    write (fd, &number, sizeof (int));
    /* extra bytes for future use */
    write (fd, extra_bytes, n_extra_bytes);
} /* end write_header */ int
parity_dump_network (char *filename)
{
    int         number;
    int         n_extra_bytes = 256;
    int         extra_bytes[256];
    int         fd;

/* open the file */
```

```
    fd = creat (filename, 0644);
    if (fd == -1) {
sprintf (error_string, "\nUnable to open %s.\n", filename);
return (FERROR);
    } /* end if */
    /* e write header */
    write_header (fd);
    number = 1; /* number of black boxes */
    write (fd, &number, sizeof (int));
    number = 151; /* data size of black box */
    write (fd, &number, sizeof (int));
    /* dump parity */
    write (fd, "parity", 7); /* name */
    number = b0bcounter; /* number of iterations */
    write (fd, &number, sizeof (int));
    number = 2; /* number of layers */
    write (fd, &number, sizeof (int));
    write (fd, "Hidden_Layer", 13); /* layer name */
    number = 2; /* size of threshold array */
    write (fd, &number, sizeof (int));
    write (fd, b0_l1_t, 2 * sizeof (float)); /* thresholds */
    write (fd, "Output_Layer", 13); /* layer name */
    number = 1; /* size of threshold array */
    write (fd, &number, sizeof (int));
    write (fd, b0_l0_t, 1 * sizeof (float)); /* thresholds */
    number = 2; /* number of connection arrays */
    write (fd, &number, sizeof (int));
    write (fd, "Hidden_Layer", 13); /* to layer name */
    write (fd, "Hidden_Layer2", 14); /* matrix name */
    number = 4; /* size of weight array */
    write (fd, &number, sizeof (int));
    write (fd, b0_Hidden_Layer2, 4 * sizeof (float)); /* connection */
    write (fd, "Output_Layer", 13); /* to layer name */
    write (fd, "Output_Layer1", 14); /* matrix name */
    number = 2; /* size of weight array */
    write (fd, &number, sizeof (int));
    write (fd, b0_Output_Layer1, 2 * sizeof (float)); /* connection */
```

```
        close (fd);
        return (0);
} /* end parity_dump_network */ static TOC_PTR
read_header (int fd)
{
    int         header_size = 272;
    int         number;
    char        extra_bytes[256];
    int         counter;
    int         n_bbs; /* number of black boxes */
    TOC_PTR     table_of_contents;
    off_t       *address_table; /* used to index bb in a file */

/* read header */
    read (fd, &number, sizeof (int)); /* compiler type */
    if (number != 100) {
sprintf (error_string, "\nWarning: This dump file is from another compiler.\n"
    } /* end if */
    read (fd, &number, sizeof (int)); /* major version */
    if (number != 6) {
sprintf (error_string, "\nWarning: Dump file created with another version (v.%
    } /* end if */
    read (fd, &number, sizeof (int)); /* minor version */
    if (number != 0) {
sprintf (error_string, "\nWarning: Dump file created with another version of c
    } /* end if */
    /* d extra bytes for future use */
    read (fd, extra_bytes, 256);
    read (fd, &n_bbs, sizeof (int));
    /* create a table of black boxes => location in file */
    address_table = (off_t *) am_alloc_mem (n_bbs * sizeof (int));
    header_size += n_bbs * sizeof (int); /* add the address_table
 * size */
    for (counter = 0; counter < n_bbs; counter++) {
address_table[counter] = header_size;
```

```
read (fd, &number, sizeof (int));
header_size += number;
    } /* end for */
    table_of_contents = (TOC_PTR) am_alloc_mem (sizeof (TOC_STRUCT));
    table_of_contents->size = n_bbs;
    table_of_contents->address_table = address_table;
    return (table_of_contents);

} /* end read_header */ static
load_black_box (int fd, char *name, char *key, TOC_PTR toc)
{
    int         table_size = toc->size;
    off_t       *address_table = toc->address_table;
    off_t       *end_of_table;
    int         n_layers, n_connections, size, counter, error_code, not_fo
    char        name_string[100], name_string2[100]; /* for reading names /* record end of address table */
    end_of_table = address_table + table_size;
    /* find key name in the file */
    do {
if (address_table == end_of_table) {
    sprintf (error_string, "\nUnable to find %s as %s.\n", name, key);
    return (DFERROR);
} /* end if */
lseek (fd, *address_table++, 0);
BPread_string (fd, name_string);
    } while (strcmp (key, name_string) != 0);

if (strcmp ("parity", name) == 0) {
read (fd, &b0bcounter, sizeof (int)); /* iteration counter */
read (fd, &n_layers, sizeof (int)); /* n layers of thresholds */
if (n_layers != 2) {
    sprintf (error_string, "\nError in reading parity\n");
    return (DFERROR);
```

```
} /* end if */
/* k load all thresholds and feedback weights */
for (counter = 0; counter < n_layers; counter++) {
    /* read the layer name and data size */
    BPread_string (fd, name_string);
    read (fd, &size, sizeof (int));
    not_found = 1; /* reset flag (0 if read the thresholds) */
    if (error_code = BPread_thresholds (fd, name_string, "Hidden_Layer", size,
return (error_code);
    if (error_code = BPread_thresholds (fd, name_string, "Output_Layer", size,
return (error_code);
    if (not_found) {
sprintf (error_string, "\nUnknown layer name in file: %s\n", name_string);
return (DFERROR);
    } /* end if not found */
} /* end for */
read (fd, &n_connections, sizeof (int));
for (counter = 0; counter < n_connections; counter++) {
    /* to layer */
    BPread_string (fd, name_string);
    /* from layer */
    BPread_string (fd, name_string2);
    read (fd, &size, sizeof (int));
    not_found = 1; /* reset flag (0 if read the weights) */
    if (error_code = BPread_weights (fd, name_string, "Hidden_Layer", name_str
return (error_code);
    if (error_code = BPread_weights (fd, name_string, "Output_Layer", name_str
return (error_code);
    if (not_found) {
sprintf (error_string, "\nUnknown connection array in file\n");
return (DFERROR);
    } /* end if */
} /* end for */
return (0);
    } /* end if */
} /* end load_black_box */
```

```
static int
load_black_box_data (char *name, char *key, char *filename)
{
    int         fd;
    TOC_PTR     toc;

/* open the file */
    fd = open (filename, 0);
    if (fd == -1) {
sprintf (error_string, "\nUnable to open %s.\n", filename);
return (FERROR);
    } /* end if */
    /* n read header */
    toc = read_header (fd);
    if (toc == (TOC_PTR) NULL)
return (DFERROR);
    return (load_black_box (fd, name, key, toc));

} /* end load_black_box_data */ int
parity_load_network (char *filename)
{
    int         fd, error_code;
    TOC_PTR     toc; /* table of contents */

/* open the file */
    fd = open (filename, 0);
    if (fd == -1) {
sprintf (error_string, "\nUnable to open %s.\n", filename);
return (FERROR);
    } /* end if */
    /* n read header */
    toc = read_header (fd);
    if (toc == (TOC_PTR) NULL)
return (DFERROR);
```

```
        if (error_code = load_black_box (fd, "parity", "parity", toc))
return (error_code);
    close (fd);
    return (0);
} /* end parity_load_network */

/* network_forward: Propagate all bb's forward. */
void
parity_network_forward ()
{
    /* all black boxes forward! */
    parity_propagate_forward ();
} /* end parity_network_forward */

/* parity_network_learn: Propagate all bb's forward then backward */
void
parity_network_learn (int iterations, void (*generator) (void))
{
    float           error = 0.0;

while (iterations--) {
/* execute the generator */
generator ();
/* all black boxes forward! */
parity_network_forward ();

/* Calc error on each output black box */
error += parity_calc_error ();
{

/* Calc grad ient and update on each black box */
    parity_calc_grad ();
    parity_update_weights (BPinertia);
}
error = 0.0;
    } /* end while iterations */
} /* end parity_network_learn */
```

```
void
parity_clear_delays ()
{
    parity_bb_clear_delays ();
} /* end parity_clear_delays */ void
parity_set_random_init_seed (long x)
{
    init_seed = x;
} void
parity_set_random_init_range (float x)
{
    init_range = x;
} int
parity_init_network ()
{
    int         error_code = 0;
    int         counter1, counter2, counter3, counter4;
    float       *weights;

BPfrandom_init (init_seed); /* init random number generator */

/* clear all data */
    bzero ((char *) network_data, 36 * sizeof (float));
    /* init table lookup for sigmoid [-1,1] */
    BPinit_sigmoid_table ();

error_string[0] = '\0'; /* empty string */
```

```
    /* init comms_buffer with network information */
    comms_buffer.network_info.aspirin_file = "parity.aspirin";
    comms_buffer.network_info.file = "parity";
    comms_buffer.network_info.temporal = 0;
    comms_buffer.network_info.n_black_boxes = 1;
    comms_buffer.network_info.n_nodes = 3;
    comms_buffer.network_info.n_connections = 9;
    comms_buffer.network_info.set_learning_rate = parity_set_learning_rate;
    comms_buffer.network_info.set_inertia = parity_set_inertia;
    comms_buffer.network_info.get_learning_rate = parity_get_learning_rate;
    comms_buffer.network_info.get_inertia = parity_get_inertia;
    comms_buffer.network_info.set_random_init_seed = parity_set_random_init_se
    comms_buffer.network_info.set_random_init_range = parity_set_random_init_r
    comms_buffer.network_info.init_network = parity_init_network;
    comms_buffer.network_info.network_forward = parity_network_forward;
    comms_buffer.network_info.network_learn = parity_network_learn;
    comms_buffer.network_info.dump_network = parity_dump_network;
    comms_buffer.network_info.load_network = parity_load_network;
    comms_buffer.network_info.error_string = parity_error_string;
    /* hook up connection buffer */
    comms_buffer.connections = connection_buffer;

/* initializing parity */
    /* init for parity:Output_Layer */
    /* init thresholds (biases) */
    for (counter1 = 0; counter1 < 1; counter1++) {
b0_l0_t[counter1] = BPfrandom (2.0 * init_range) - init_range;
    } /* end for counter1 */
    /* init weights for parity:Output_Layer */
    /* initialize w/small random weights */
    for (counter1 = 0; counter1 < 2; counter1++) {
b0_Output_Layer1[counter1] = BPfrandom (2.0 * init_range) - init_range;
    } /* end for */
    /* init for parity:Hidden_Layer */
    /* init thresholds (biases) */
    for (counter1 = 0; counter1 < 2; counter1++) {
b0_l1_t[counter1] = BPfrandom (2.0 * init_range) - init_range;
```

```
    } /* end for counter1 */
    /* init weights for parity:Hidden_Layer */
    /* initialize w/small random weights */
    for (counter1 = 0; counter1 < 4; counter1++) {
b0_Hidden_Layer2[counter1] = BPfrandom (2.0 * init_range) - init_range;
    } /* end for */
    return (error_code);
} /* end parity_init_network */

/* parity_query_network   This function returns a pointer to a     */
/* layer buffer specified by the integer      */
/* pair of arguments. The first integer       */
/* is the black box index and the second      */
/* is the layer index. If no layer has        */
/* these indices then (LB_PTR)NULL is         */
/* returned. There is only ONE LAYER BUFFER, */
/* so COPY!! the data you need for display.  */
/* To change the network state alter the      */
/* data in the layer buffer.                  */
LB_PTR
parity_query_network (int bb_index, int layer_index)
{
    /*
     * look up the black box first, then the layer in the black box, if
     * either index does not exist return (LB_PTR)NULL.
     */
    /* Black Box parity */
    if (bb_index == 0) {
comms_buffer.black_box_info.bb_index = 0;
comms_buffer.black_box_info.bb_name = "parity";
comms_buffer.black_box_info.dynamic = 1;
comms_buffer.black_box_info.efferent = 1;
comms_buffer.black_box_info.n_layers = 2;
comms_buffer.black_box_info.n_inputs = 2;
comms_buffer.black_box_info.n_bb_inputs = 0;
comms_buffer.black_box_info.n_bb_outputs = 0;
comms_buffer.black_box_info.inputs_xdim = 2;
```

```
comms_buffer.black_box_info.inputs_ydim = 1;
comms_buffer.black_box_info.inputs_delay = 0;
comms_buffer.black_box_info.output_layer_index = 0;
comms_buffer.black_box_info.forward_prop = parity_propagate_forward;
comms_buffer.black_box_info.set_backprop_counter = parity_set_backprop_counter
comms_buffer.black_box_info.get_backprop_counter = parity_get_backprop_counter
comms_buffer.black_box_info.calc_grad = parity_calc_grad;
comms_buffer.black_box_info.update_weights = parity_update_weights;
comms_buffer.black_box_info.set_target_output = parity_set_target_output;
comms_buffer.black_box_info.get_target_output = parity_get_target_output;
comms_buffer.black_box_info.get_output = parity_get_output;
comms_buffer.black_box_info.set_input = parity_set_input;
comms_buffer.black_box_info.get_input = parity_get_input;
/* Layer parity:Output_Layer */
if (layer_index == 0) {
    comms_buffer.layer_index = 0;
    comms_buffer.layer_type = 5;
    comms_buffer.layer_name = "parity:Output_Layer";
    comms_buffer.n_nodes = 1;
    comms_buffer.delay = 0;
    comms_buffer.xdim = 1;
    comms_buffer.ydim = 1;
    comms_buffer.values = b0_10_v;
    comms_buffer.thresholds = b0_10_t;
    comms_buffer.delta_thresholds = b0_10_dt;
    comms_buffer.credit = b0_10_c;
    comms_buffer.order = 0;
    (comms_buffer.connections)[0].type = 0;
    (comms_buffer.connections)[0].order = 1;
    (comms_buffer.connections)[0].shared = 0;
    (comms_buffer.connections)[0].size = 2;
    (comms_buffer.connections)[0].delay = 0;
    (comms_buffer.connections)[0].from_layer_name = "parity:Hidden_Layer";
    (comms_buffer.connections)[0].tess_xdim = 2;
    (comms_buffer.connections)[0].tess_ydim = 1;
    (comms_buffer.connections)[0].tess_xoverlap = 2;
    (comms_buffer.connections)[0].tess_yoverlap = 0;
```

```
        (comms_buffer.connections)[0].tess_xoffset = 0;
        (comms_buffer.connections)[0].tess_yoffset = 0;
        (comms_buffer.connections)[0].from_bb_index = 0;
        (comms_buffer.connections)[0].from_layer_index = 1;
        (comms_buffer.connections)[0].from_size = 2;
        (comms_buffer.connections)[0].from_xdim = 2;
        (comms_buffer.connections)[0].from_ydim = 1;
        (comms_buffer.connections)[0].weights = b0_Output_Layer1;
        (comms_buffer.connections)[0].delta_weights = b0_Output_Layer1d;
        comms_buffer.n_inputs = 1;
        comms_buffer.n_outputs = 0;
        return (&comms_buffer); /* success!! */
    } /* end if for Layer parity:Output_Layer
     * (number 0) */
    /* Layer parity:Hidden_Layer */
    if (layer_index == 1) {
        comms_buffer.layer_index = 1;
        comms_buffer.layer_type = 5;
        comms_buffer.layer_name = "parity:Hidden_Layer";
        comms_buffer.n_nodes = 2;
        comms_buffer.delay = 0;
        comms_buffer.xdim = 2;
        comms_buffer.ydim = 1;
        comms_buffer.values = b0_l1_v;
        comms_buffer.thresholds = b0_l1_t;
        comms_buffer.delta_thresholds = b0_l1_dt;
        comms_buffer.credit = b0_l1_c;
        comms_buffer.order = 0;
        (comms_buffer.connections)[0].type = 0;
        (comms_buffer.connections)[0].order = 1;
        (comms_buffer.connections)[0].shared = 0;
        (comms_buffer.connections)[0].size = 4;
        (comms_buffer.connections)[0].delay = 0;
        (comms_buffer.connections)[0].from_layer_name = "$INPUTS";
        (comms_buffer.connections)[0].tess_xdim = 2;
        (comms_buffer.connections)[0].tess_ydim = 1;
        (comms_buffer.connections)[0].tess_xoverlap = 2;
```

```
        (comms_buffer.connections)[0].tess_yoverlap = 0;
        (comms_buffer.connections)[0].tess_xoffset = 0;
        (comms_buffer.connections)[0].tess_yoffset = 0;
        (comms_buffer.connections)[0].from_bb_index = 0;
        (comms_buffer.connections)[0].from_layer_index = -1; /* $INPUTS */
        (comms_buffer.connections)[0].from_size = 2;
        (comms_buffer.connections)[0].from_xdim = 2;
        (comms_buffer.connections)[0].from_ydim = 1;
        (comms_buffer.connections)[0].weights = b0_Hidden_Layer2;
        (comms_buffer.connections)[0].delta_weights = b0_Hidden_Layer2d;
        comms_buffer.n_inputs = 1;
        comms_buffer.n_outputs = 1;
        return (&comms_buffer); /* success!! */
} /* end if for Layer parity:Hidden_Layer
 * (number 1) */
return ((LB_PTR) NULL);
    } /* end if for black box parity (number: 0) */
    return ((LB_PTR) NULL);
} /* end parity_query_network */ void
parity_ascii_dump_network (int formatted)
{
    int         counter1, counter2, counter3, counter4;
    float       *weights;

if (!formatted)
printf ("\n\n#");

if (formatted)
printf ("\n\nBlackBox: parity");

if (formatted)
printf ("\nIterations: %d", b0bcounter);

else
```

```
printf ("\n%d", b0bcounter);

if (formatted)
printf ("\nLayer: parity:Output_Layer");
    /* print for parity:Output_Layer */
    for (counter4 = 0; counter4 < 1; counter4++) {
for (counter3 = 0; counter3 < 1; counter3++) { if (formatted)
printf ("\nNode[%d,%d]:", counter3, counter4);

if (formatted)
printf ("\n   Bias=%.12f", b0_10_t[counter3 + (1 * counter4)]);
    else
printf ("\n%.12f", b0_10_t[counter3 + (1 * counter4)]);
} /* end for counter3 */
    } /* end for counter4 */ if (formatted)
printf ("\nConnection from parity:Hidden_Layer:");
    for (counter4 = 0; counter4 < 1; counter4++) {
for (counter3 = 0; counter3 < 1; counter3++) { if (formatted)
printf ("\nNode[%d,%d]:", counter3, counter4);
    weights = b0_Output_Layer1 + (counter3 * 2) + (counter4 * 2);
    for (counter1 = 0; counter1 < 1; counter1++) {
if (formatted)
    printf ("\n");
for (counter2 = 0; counter2 < 2; counter2++) {
    if (formatted)
printf ("%.12f ", *weights++);
    else
printf ("\n%.12f ", *weights++);
} /* end for */
    } /* end for */
} /* end for */
```

```
    } /* end for */ if (formatted)
printf ("\nLayer: parity:Hidden_Layer");
    /* print for parity:Hidden_Layer */
    for (counter4 = 0; counter4 < 1; counter4++) {
for (counter3 = 0; counter3 < 2; counter3++) { if (formatted)
printf ("\nNode[%d,%d]:", counter3, counter4);

if (formatted)
printf ("\n   Bias=%.12f", b0_l1_t[counter3 + (2 * counter4)]);
    else
printf ("\n%.12f", b0_l1_t[counter3 + (2 * counter4)]);
} /* end for counter3 */
    } /* end for counter4 */ if (formatted)
printf ("\nConnection from $INPUTS:");
    for (counter4 = 0; counter4 < 1; counter4++) {
for (counter3 = 0; counter3 < 2; counter3++) { if (formatted)
printf ("\nNode[%d,%d]:", counter3, counter4);
    weights = b0_Hidden_Layer2 + (counter3 * 2) + (counter4 * 4);
    for (counter1 = 0; counter1 < 1; counter1++) {
if (formatted)
    printf ("\n");
for (counter2 = 0; counter2 < 2; counter2++) {
    if (formatted)
printf ("%.12f ", *weights++);
    else
printf ("\n%.12f ", *weights++);
} /* end for */
weights += 2;
    } /* end for */
```

```
} /* end for */
    } /* end for */
    if (!formatted)
printf ("\n\n#");
    printf ("\n");
} /* end parity_ascii_dump_network */ void
parity_load_ascii_network ()
{
    int         counter1, counter2, counter3, counter4;
    float       *weights;

{
char        c;
do {
    am_fread (&c, sizeof (char), 1, stdin);
} while (c != '#');

} scanf ("\n%d", &b0bcounter);
    /* read for parity:Output_Layer */
    for (counter4 = 0; counter4 < 1; counter4++) {
for (counter3 = 0; counter3 < 1; counter3++) { scanf ("%f", &b0_10_t[counter3 + (1 * counter4)]);
} /* end for counter3 */
    } /* end for counter4 */
    for (counter4 = 0; counter4 < 1; counter4++) {
for (counter3 = 0; counter3 < 1; counter3++) {
    weights = b0_Output_Layer1 + (counter3 * 2) + (counter4 * 2);
    for (counter1 = 0; counter1 < 1; counter1++) {
for (counter2 = 0; counter2 < 2; counter2++) {
    scanf ("%f", weights++);
} /* end for */
```

```c
    } /* end for */
} /* end for */
    } /* end for */
    /* read for parity:Hidden_Layer */
    for (counter4 = 0; counter4 < 1; counter4++) {
for (counter3 = 0; counter3 < 2; counter3++) { scanf ("%f", &b0_l1_t[counter3 + (2 * counter4)]);
} /* end for counter3 */
    } /* end for counter4 */
    for (counter4 = 0; counter4 < 1; counter4++) {
for (counter3 = 0; counter3 < 2; counter3++) {
    weights = b0_Hidden_Layer2 + (counter3 * 2) + (counter4 * 4);
    for (counter1 = 0; counter1 < 1; counter1++) {
for (counter2 = 0; counter2 < 2; counter2++) {
    scanf ("%f", weights++);
} /* end for */
weights += 2;
    } /* end for */
} /* end for */
    } /* end for */

{
int         code;
char        c;
do {
    code = am_fread (&c, sizeof (char), 1, stdin);
} while (code);

}
} /* end parity_load_ascii_network */

/* network_initialize: Init simulation, optionaly load dump. */
void
network_initialize (char *filename, int verbose)
{
    /* initialize the simulator */
```

```
    if (parity_init_network ()) {
fprintf (stderr, "%s", parity_error_string ());
am_exit (EXIT_FAILURE);
    } /* end if init */
    /* x load dump file? */
    if (filename != (char *) NULL) {
if (verbose)
    printf ("\nLoading Saved Network: %s", filename);
if (parity_load_network (filename)) {
    fprintf (stderr, "%s", parity_error_string ());
    am_exit (EXIT_FAILURE);
} /* end if load_network */
    } /* end if filename */
    if (verbose) {
printf ("\n\nBackpropagation Learning");
printf ("\n\nBlack Boxes:\n");
printf ("\nparity (Saved at Backprop Iteration %d)", parity_get_backprop_count
    } /* end if verbose */
} /* end network_initialize */

/* network_forward: Propagate all bb's forward. */
void
network_forward (int iterations, void (*generator) (void))
{
    while (iterations--) {
generator ();
parity_network_forward ();
    } /* end while */
} /* end network_forward */

/* network_learn: Propagate all bb's forward then backward */
void
network_learn (int iterations, void (*generator) (void))
{
    parity_network_learn (iterations, generator);
} /* end network_learn */
```

```
void
network_clear_delays ()
{
    parity_clear_delays ();
} /* end network_clear_delays */ void
network_dump (char *filename)
{
    if (parity_dump_network (filename)) {
fprintf (stderr, "%s", parity_error_string ());
    } /* end if dump */
} /* end network_dump */ void
network_load (char *filename)
{
    if (parity_load_network (filename)) {
fprintf (stderr, "%s", parity_error_string ());
    } /* end if load */
} /* end network_load */ void
network_ascii_dump (int formatted)
{
    parity_ascii_dump_network (formatted);
} /* end network_ascii_dump */ void
network_load_ascii ()
{
    parity_load_ascii_network ();
} /* end network_load_ascii */

LB_PTR
network_query (int bbindex, int layerindex)
{
```

```
        return (parity_query_network (bbindex, layerindex));
} /* end network_query */

/* network_forward_print: print outputs/target for each bb */
void
network_forward_print (int iterations, void (*generator) (void))
{
    int         icounter, counter;
    float       *ptr;

for (icounter = 0; icounter < iterations; icounter++) {
generator ();
parity_network_forward ();
printf ("\nIteration: %d", icounter);
printf ("\nblack box parity:");
ptr = parity_get_output ();
counter = 1;
printf ("\n\tOutputs:");
while (counter--)
    printf (" %f", *ptr++);
ptr = parity_get_target_output ();
counter = 1;
printf ("\n\tTargets:");
while (counter--)
    printf (" %f", *ptr++);
    } /* end while */
} /* end network_forward_print */

/* network_forward_pdpfa: calc pd, pfa, pfn */
void
network_forward_pdpfa (int iterations, void (*generator) (void), float thresho
{
    int         counter;
    float       *ptr1, *ptr2;
    int         total = iterations;
    float       parity_sum;
    int         parity_detections = 0;
```

```
        double      parityMin[1];
        double      parityMax[1];
        float       parityMean[1];
        float       paritySquare[1];

if (!iterations)
return;
        threshold *= threshold;
        for (counter = 0; counter < 1; counter++) { /* init */
parityMin[counter] = AM_HUGE_VAL;
parityMax[counter] = -AM_HUGE_VAL;
parityMean[counter] = 0.0;
paritySquare[counter] = 0.0;
        } /* end for */
        while (iterations--) {
generator ();
parity_network_forward ();
parity_sum = 0.0;
ptr1 = parity_get_output ();
ptr2 = parity_get_target_output ();
for (counter = 0; counter < 1; counter++) { /* calc sum of squared
 * diffs */
        float           val, target, diff;

val = *ptr1++;
        target = *ptr2++;
        parityMean[counter] += val;
        paritySquare[counter] += val * val;
        if (val < parityMin[counter])
parityMin[counter] = val;
        if (val > parityMax[counter])
parityMax[counter] = val;
        diff = val - target;
        parity_sum += diff * diff;
} /* end for */
/* count */
if (parity_sum < threshold)
```

```
    parity_detections++;
  } /* end while */ printf ("\n\nparity:");
  printf ("\nMaxima: ");
  for (counter = 0; counter < 1; counter++) { /* calc max */
printf ("%f ", parityMax[counter]);
  } /* end for */
  printf ("\nMinima: ");
  for (counter = 0; counter < 1; counter++) { /* calc min */
printf ("%f ", parityMin[counter]);
  } /* end for */
  printf ("\nMeans: ");
  for (counter = 0; counter < 1; counter++) { /* calc mean */
parityMean[counter] /= (float) total;
printf ("%f ", parityMean[counter]);
  } /* end for */
  printf ("\nVariances: ");
  for (counter = 0; counter < 1; counter++) { /* calc variance */
paritySquare[counter] /= (float) total;
printf ("%f ", paritySquare[counter] - (parityMean[counter] * parityMean[count
  } /* end for */
  /* print stats */
  printf ("\n\nPd = %d/%d = %f", parity_detections, total, (float) parity_de
  printf ("\nPfa = %d/%d = %f", total - parity_detections, total, (float) (t
} /* end network_forward_pdpfa */

/* end of parity.c */
```

*Appendix B*

```c
/* You may want to run this thru 'cb' or 'indent' */

/** Back-propagation simulation for parity.aspirin **/ include "aspirin_bp.h"

include "BpSim.h"

#define sgn(x) ((x < 0) ? -1.0 : ((x > 0) ? 1.0 : 0.0))

/* GLOBAL VARIABLES */
float        BPlearning_rate = 0.2;
float        BPinertia = 0.95;
static float init_range = 0.1; /* feedforward weights */
static float ar_init_range = 0.001; /* autogressive feedback weights */
static long  init_seed = 123;

char         error_string[E_STRING_SIZE]; /* describes current error */

/* Connection Buffer for interconnect data */
static CB    connection_buffer[2];

/* Communication Buffer */
static LB    comms_buffer;

/* NETWORK DATA */
#ifndef PADDING
# define PADDING 0
#endif
static float network_data[36 + PADDING];
```

```
/* data for parity */
static unsigned int b0fcounter = 0; /* # times fwd */
static unsigned int b0bcounter = 0; /* # times bkwd */

/* parity:Hidden_Layer */
extern float
regularSigmoid (float x); /* user's transfer function */
extern float
treeLikeHiddenUnit (float x); /* user's derivative of transfer */
#define b0_l1_n (network_data + 0) /* net inputs */
#define b0_l1_v (network_data + 2) /* values */
#define b0_l1_t (network_data + 9) /* thresholds */
#define b0_l1_ac (network_data + 11) /* accumulated changes */
#define b0_l1_dt (network_data + 13) /* delta thresholds */
#define b0_l1_c (network_data + 4) /* credit */

/* parity:Output_Layer */
extern float
regularSigmoid (float x); /* user's transfer function */
extern float
treeLikeOutputUnit (float x); /* user's derivative of transfer */
#define b0_l0_n (network_data + 6) /* net inputs */
#define b0_l0_v (network_data + 7) /* values */
#define b0_l0_t (network_data + 15) /* thresholds */
#define b0_l0_ac (network_data + 16) /* accumulated changes */
#define b0_l0_dt (network_data + 17) /* delta thresholds */
define b0_l0_c (network_data + 8) /* credit */ static float    *b0_input_vector = (float *) NULL; /* input vector */ define b0_input_vector0 b0_input_vector /* input vector */ static float    *b0_target_output = (float *) NULL; /* desired output */

/* parity:Hidden_Layer input connections */
#define b0_Hidden_Layer2 (network_data + 18) /* weights from $INPUTS */
#define b0_Hidden_Layer2ac (network_data + 22) /* accumulated changes */
```

```
#define b0_Hidden_Layer2d (network_data + 26) /* delta weights */

/* parity:Output_Layer input connections */
#define b0_Output_Layer1 (network_data + 30) /* weights from
 * parity:Hidden_Layer */
#define b0_Output_Layer1ac (network_data + 32) /* accumulated changes */
#define b0_Output_Layer1d (network_data + 34) /* delta weights */

/* Black Box Control Functions */

/** parity **/ void
parity_bb_clear_delays ()
{
} /* end parity_bb_clear_delays */

/* parity Forward Propagation */
void
parity_propagate_forward ()
{

/* --------------- parity:Hidden_Layer --------------- */
    /* Connection to parity:Hidden_Layer from $INPUTS */
    BPlvdot (b0_Hidden_Layer2, b0_input_vector + 0, 2, b0_l1_v, 2, 2);
    /* calculate the transfer function for parity:Hidden_Layer */
    BPuser (b0_l1_v, b0_l1_n, b0_l1_t, 2, regularSigmoid);

/* --------------- parity:Output_Layer --------------- */
    /* Connection to parity:Output_Layer from parity:Hidden_Layer */
    BPlvdot (b0_Output_Layer1, b0_l1_v + 0, 2, b0_l0_v, 2, 1);
    /* calculate the transfer function for parity:Output_Layer */
    BPuser (b0_l0_v, b0_l0_n, b0_l0_t, 1, regularSigmoid);

b0fcounter++; /* increment fwd counter */
} /* end parity_ propagate_forward */
```

```
/***************** parity Error  *****************/
float
parity_calc_error ()
{
    float           error;
    /*** parity:Output_Layer ***/
    /* Calc diff between output and target output */
    /* Modulate by learning rate times 1/(update_interval) */
    error = BPoutput_error (b0_target_output, b0_10_v, b0_10_c, BPlearning_rat
    return (error);
} /* end parity_calc_error */

/***************** parity Backward Propagation (Gradient Calc) **************
void
parity_calc_grad ()
{ float           tempWeights[2];
    int             i;

b0bcounter++; /* increment bwd counter */

/* clear errors */
    bzero ((char *) b0_11_c, 2 * sizeof (float));

/* backprop */

/* calc deriv of function and multiply by credit */
    BPderiv_user (b0_10_n, b0_10_c, 1, treeLikeOutputUnit);

/* Accumulate Biases */
    BPaccum_biases (b0_10_ac, b0_10_c, 1);

/* Do all connections into parity:Output_Layer */

/* Connection to parity:Output_Layer from parity:Hidden_Layer */
```

```
    /* Accumulate weight changes */
    for (i = 0; i < 2; i++) {
tempWeights[i] = sgn (*(float *) (&b0_Output_Layer1[i]));
    }

BPaccum_weights_from_hidden (b0_l0_c, b0_l1_v + 0, b0_l1_c + 0, tempWeight

/* calc deriv of function and multiply by credit */
    BPderiv_user (b0_l1_n, b0_l1_c, 2, treeLikeHiddenUnit);

/* Accumulate Biases */
    BPaccum_biases (b0_l1_ac, b0_l1_c, 2);

/* Do all connections into parity:Hidden_Layer */

/* Connection to parity:Hidden_Layer from $INPUTS */

/* Accumulate weight changes */
    BPaccum_weights_from_input (b0_l1_c, b0_input_vector + 0, b0_Hidden_Layer2
} /* end parity_calc_grad */

/***************** parity Update Weights *****************/
void
parity_update_weights (float scalar)
{

/* update the weights */

/* Upate Biases */
    BPupdate_weights (scalar, b0_l0_ac, b0_l0_t, b0_l0_dt, 1);
    bzero ((char *) b0_l0_ac, 1 * sizeof (float));
    /* Upate Connection from parity:Hidden_Layer to parity:Output_Layer */
    BPupdate_weights (scalar, b0_Output_Layer1ac, b0_Output_Layer1, b0_Output_
    /* Clear Connection from parity:Hidden_Layer to parity:Output_Layer */
    bzero ((char *) b0_Output_Layer1ac, 2 * sizeof (float));
```

```
    /* Upate Biases */
    BPupdate_weights (scalar, b0_l1_ac, b0_l1_t, b0_l1_dt, 2);
    bzero ((char *) b0_l1_ac, 2 * sizeof (float));
    /* Upate Connection from $INPUTS to parity:Hidden_Layer */
    BPupdate_weights (scalar, b0_Hidden_Layer2ac, b0_Hidden_Layer2, b0_Hidden_
    /* Clear Connection from $INPUTS to parity:Hidden_Layer */
    bzero ((char *) b0_Hidden_Layer2ac, 4 * sizeof (float));
} /* end parity_update_weights */

/* COUNTER CONTROL */
void
parity_set_backprop_counter (int x)
{
    b0bcounter = x;
} /* end parity_set_backprop_counter */
int
parity_get_backprop_counter ()
{
    return (b0bcounter);
} /* end parity_get_backprop_counter */

/* INPUT CONTROL */
void
parity_set_input (float *vector)
{
    b0_input_vector = vector;
} /* end parity_set_input */ float          *
parity_get_input ()
{
    return (b0_input_vector);
} /* end parity_get_input */

/* TARGET OUTPUT CONTROL */ float          *
```

```
parity_get_output ()
{
    return (b0_10_v);
} /* end parity_get_output */ void
parity_set_target_output (float *vector)
{
    b0_target_output = vector;
} /* end parity_set_target_output */ float        *
parity_get_target_output ()
{
    return (b0_target_output);
} /* end parity_get_target_output */

/* NETWORK FUNCTIONS */

/* parity_error_string: Return string describing error */
char         *
parity_error_string ()
{
    return (error_string);
} /* end parity_error_string */

/* parity_set_learning_rate: Set learning rate */
void
parity_set_learning_rate (float x)
{
    BPlearning_rate = x;
} /* end parity_set_learning_rate */

/* parity_set_inertia: Set inertia */
void
parity_set_inertia (float x)
{
```

```
    BPinertia = x;
} /* end parity_set_inertia */

/* parity_get_learning_rate: Return the  learning rate */
float
parity_get_learning_rate ()
{
    return (BPlearning_rate);
} /* end parity_get_learning_rate */

/* parity_get_inertia: Return the  inertia */
float
parity_get_inertia ()
{
    return (BPinertia);
} /* end parity_get_inertia */ static
write_header (int fd)
{
    int         number;
    int         n_extra_bytes = 256;
    char        extra_bytes[256];

/* write header */
    number = 100; /* compiler identifier */
    write (fd, &number, sizeof (int));
    number = 6; /* major version */
    write (fd, &number, sizeof (int));
    number = 0; /* minor version */
    write (fd, &number, sizeof (int));
    /* extra bytes for future use */
    write (fd, extra_bytes, n_extra_bytes);
} /* end write_header */ int
```

```
parity_dump_network (char *filename)
{
    int         number;
    int         n_extra_bytes = 256;
    int         extra_bytes[256];
    int         fd;

/* open the file */
    fd = creat (filename, 0644);
    if (fd == -1) {
sprintf (error_string, "\nUnable to open %s.\n", filename);
return (FERROR);
    } /* end if */
    /* e write header */
    write_header (fd);
    number = 1; /* number of black boxes */
    write (fd, &number, sizeof (int));
    number = 151; /* data size of black box */
    write (fd, &number, sizeof (int));
    /* dump parity */
    write (fd, "parity", 7); /* name */
    number = b0bcounter; /* number of iterations */
    write (fd, &number, sizeof (int));
    number = 2; /* number of layers */
    write (fd, &number, sizeof (int));
    write (fd, "Hidden_Layer", 13); /* layer name */
    number = 2; /* size of threshold array */
    write (fd, &number, sizeof (int));
    write (fd, b0_11_t, 2 * sizeof (float)); /* thresholds */
    write (fd, "Output_Layer", 13); /* layer name */
    number = 1; /* size of threshold array */
    write (fd, &number, sizeof (int));
    write (fd, b0_10_t, 1 * sizeof (float)); /* thresholds */
    number = 2; /* number of connection arrays */
    write (fd, &number, sizeof (int));
    write (fd, "Hidden_Layer", 13); /* to layer name */
    write (fd, "Hidden_Layer2", 14); /* matrix name */
```

```
    number = 4; /* size of weight array */
    write (fd, &number, sizeof (int));
    write (fd, b0_Hidden_Layer2, 4 * sizeof (float)); /* connection */
    write (fd, "Output_Layer", 13); /* to layer name */
    write (fd, "Output_Layer1", 14); /* matrix name */
    number = 2; /* size of weight array */
    write (fd, &number, sizeof (int));
    write (fd, b0_Output_Layer1, 2 * sizeof (float)); /* connection */
    close (fd);
    return (0);
} /* end parity_dump_network */ static TOC_PTR
read_header (int fd)
{
    int         header_size = 272;
    int         number;
    char        extra_bytes[256];
    int         counter;
    int         n_bbs; /* number of black boxes */
    TOC_PTR     table_of_contents;
    off_t       *address_table; /* used to index bb in a file */

/* read header */
    read (fd, &number, sizeof (int)); /* compiler type */
    if (number != 100) {
sprintf (error_string, "\nWarning: This dump file is from another compiler.\n"
    } /* end if */
    read (fd, &number, sizeof (int)); /* major version */
    if (number != 6) {
sprintf (error_string, "\nWarning: Dump file created with another version (v.%
    } /* end if */
    read (fd, &number, sizeof (int)); /* minor version */
    if (number != 0) {
sprintf (error_string, "\nWarning: Dump file created with another version of c
    } /* end if */
    /* d extra bytes for future use */
```

```
    read (fd, extra_bytes, 256);
    read (fd, &n_bbs, sizeof (int));
    /* create a table of black boxes => location in file */
    address_table = (off_t *) am_alloc_mem (n_bbs * sizeof (int));
    header_size += n_bbs * sizeof (int); /* add the address_table
 * size */
    for (counter = 0; counter < n_bbs; counter++) {
address_table[counter] = header_size;
read (fd, &number, sizeof (int));
header_size += number;
    } /* end for */
    table_of_contents = (TOC_PTR) am_alloc_mem (sizeof (TOC_STRUCT));
    table_of_contents->size = n_bbs;
    table_of_contents->address_table = address_table;
    return (table_of_contents);

} /* end read_header */ static
load_black_box (int fd, char *name, char *key, TOC_PTR toc)
{
    int        table_size = toc->size;
    off_t      *address_table = toc->address_table;
    off_t      *end_of_table;
    int        n_layers, n_connections, size, counter, error_code, not_fo
    char       name_string[100], name_string2[100]; /* for reading names /* record end of address table */
    end_of_table = address_table + table_size;
    /* find key name in the file */
    do {
if (address_table == end_of_table) {
    sprintf (error_string, "\nUnable to find %s as %s.\n", name, key);
    return (DFERROR);
} /* end if */
lseek (fd, *address_table++, 0);
BPread_string (fd, name_string);
```

```
      } while (strcmp (key, name_string) != 0);

if (strcmp ("parity", name) == 0) {
read (fd, &b0bcounter, sizeof (int)); /* iteration counter */
read (fd, &n_layers, sizeof (int)); /* n layers of thresholds */
if (n_layers != 2) {
    sprintf (error_string, "\nError in reading parity\n");
    return (DFERROR);
} /* end  if */
/* k load all thresholds and feedback weights */
for (counter = 0; counter < n_layers; counter++) {
    /* read the layer name and data size */
    BPread_string (fd, name_string);
    read (fd, &size, sizeof (int));
    not_found = 1; /* reset flag (0 if read the thresholds) */
    if (error_code = BPread_thresholds (fd, name_string, "Hidden_Layer", size,
return (error_code);
    if (error_code = BPread_thresholds (fd, name_string, "Output_Layer", size,
return (error_code);
    if (not_found) {
sprintf (error_string, "\nUnknown layer name in file: %s\n", name_string);
return (DFERROR);
    } /* end if not found */
} /* end for */
read (fd, &n_connections, sizeof (int));
for (counter = 0; counter < n_connections; counter++) {
    /* to layer */
    BPread_string (fd, name_string);
    /* from layer */
    BPread_string (fd, name_string2);
    read (fd, &size, sizeof (int));
    not_found = 1; /* reset flag (0 if read the weights) */
    if (error_code = BPread_weights (fd, name_string, "Hidden_Layer", name_str
return (error_code);
    if (error_code = BPread_weights (fd, name_string, "Output_Layer", name_str
return (error_code);
    if (not_found) {
```

```
    sprintf (error_string, "\nUnknown connection array in file\n");
    return (DFERROR);
        } /* end if */
    } /* end for */
    return (0);
        } /* end if */
    } /* end load_black_box */ static int
load_black_box_data (char *name, char *key, char *filename)
{
    int         fd;
    TOC_PTR     toc;

/* open the file */
    fd = open (filename, 0);
    if (fd == -1) {
    sprintf (error_string, "\nUnable to open %s.\n", filename);
    return (FERROR);
    } /* end if */
    /* n read header */
    toc = read_header (fd);
    if (toc == (TOC_PTR) NULL)
    return (DFERROR);
        return (load_black_box (fd, name, key, toc));

} /* end load_black_box_data */ int
parity_load_network (char *filename)
{
    int         fd, error_code;
    TOC_PTR     toc; /* table of contents */

/* open the file */
    fd = open (filename, 0);
```

```
    if (fd == -1) {
sprintf (error_string, "\nUnable to open %s.\n", filename);
return (FERROR);
    } /* end if */
    /* n read header */
    toc = read_header (fd);
    if (toc == (TOC_PTR) NULL)
return (DFERROR);
    if (error_code = load_black_box (fd, "parity", "parity", toc))
return (error_code);
    close (fd);
    return (0);
} /* end parity_load_network */

/* network_forward: Propagate all bb's forward. */
void
parity_network_forward ()
{
    /* all black boxes forward! */
    parity_propagate_forward ();
} /* end parity_network_forward */

/* parity_network_learn: Propagate all bb's forward then backward */
void
parity_network_learn (int iterations, void (*generator) (void))
{
    float         error = 0.0;

while (iterations--) {
/* execute the generator */
generator ();
/* all black boxes forward! */
parity_network_forward ();

/* Calc error on each output black box */
error += parity_calc_error ();
{
```

```
    /* Calc grad ient and update on each black box */
    parity_calc_grad ();
    parity_update_weights (BPinertia);
}
error = 0.0;
    } /* end while iterations */
} /* end parity_network_learn */ void
parity_clear_delays ()
{
    parity_bb_clear_delays ();
} /* end parity_clear_delays */ void
parity_set_random_init_seed (long x)
{
    init_seed = x;
} void
parity_set_random_init_range (float x)
{
    init_range = x;
} int
parity_init_network ()
{
    int         error_code = 0;
    int         counter1, counter2, counter3, counter4;
    float       *weights;

BPfrandom_init (init_seed); /* init random number generator */
```

```
    /* clear all data */
    bzero ((char *) network_data, 36 * sizeof (float));
    /* init table lookup for sigmoid [-1,1] */
    BPinit_sigmoid_table ();

error_string[0] = '\0'; /* empty string */

/* init comms_buffer with network information */
    comms_buffer.network_info.aspirin_file = "parity.aspirin";
    comms_buffer.network_info.file = "parity";
    comms_buffer.network_info.temporal = 0;
    comms_buffer.network_info.n_black_boxes = 1;
    comms_buffer.network_info.n_nodes = 3;
    comms_buffer.network_info.n_connections = 9;
    comms_buffer.network_info.set_learning_rate = parity_set_learning_rate;
    comms_buffer.network_info.set_inertia = parity_set_inertia;
    comms_buffer.network_info.get_learning_rate = parity_get_learning_rate;
    comms_buffer.network_info.get_inertia = parity_get_inertia;
    comms_buffer.network_info.set_random_init_seed = parity_set_random_init_se
    comms_buffer.network_info.set_random_init_range = parity_set_random_init_r
    comms_buffer.network_info.init_network = parity_init_network;
    comms_buffer.network_info.network_forward = parity_network_forward;
    comms_buffer.network_info.network_learn = parity_network_learn;
    comms_buffer.network_info.dump_network = parity_dump_network;
    comms_buffer.network_info.load_network = parity_load_network;
    comms_buffer.network_info.error_string = parity_error_string;
    /* hook up connection buffer */
    comms_buffer.connections = connection_buffer;

/* initializing parity */
    /* init for parity:Output_Layer */
    /* init thresholds (biases) */
    for (counter1 = 0; counter1 < 1; counter1++) {
b0_l0_t[counter1] = BPfrandom (2.0 * init_range) - init_range;
    } /* end for counter1 */
    /* init weights for parity:Output_Layer */
```

```
    /* initialize w/small random weights */
    for (counter1 = 0; counter1 < 2; counter1++) {
b0_Output_Layer1[counter1] = BPfrandom (2.0 * init_range) - init_range;
    } /* end for */
    /* init for parity:Hidden_Layer */
    /* init thresholds (biases) */
    for (counter1 = 0; counter1 < 2; counter1++) {
b0_l1_t[counter1] = BPfrandom (2.0 * init_range) - init_range;
    } /* end for counter1 */
    /* init weights for parity:Hidden_Layer */
    /* initialize w/small random weights */
    for (counter1 = 0; counter1 < 4; counter1++) {
b0_Hidden_Layer2[counter1] = BPfrandom (2.0 * init_range) - init_range;
    } /* end for */
    return (error_code);
} /* end parity_init_network */

/* parity_query_network   This function returns a pointer to a     */
/* layer buffer specified by the integer      */
/* pair of arguments. The first integer       */
/* is the black box index and the second      */
/* is the layer index. If no layer has        */
/* these indices then (LB_PTR)NULL is         */
/* returned. There is only ONE LAYER BUFFER,  */
/* so COPY!! the data you need for display.   */
/* To change the network state alter the      */
/* data in the layer buffer.                  */
LB_PTR
parity_query_network (int bb_index, int layer_index)
{
    /*
     * look up the black box first, then the layer in the black box, if
     * either index does not exist return (LB_PTR)NULL.
     */
    /* Black Box parity */
    if (bb_index == 0) {
comms_buffer.black_box_info.bb_index = 0;
```

```
comms_buffer.black_box_info.bb_name = "parity";
comms_buffer.black_box_info.dynamic = 1;
comms_buffer.black_box_info.efferent = 1;
comms_buffer.black_box_info.n_layers = 2;
comms_buffer.black_box_info.n_inputs = 2;
comms_buffer.black_box_info.n_bb_inputs = 0;
comms_buffer.black_box_info.n_bb_outputs = 0;
comms_buffer.black_box_info.inputs_xdim = 2;
comms_buffer.black_box_info.inputs_ydim = 1;
comms_buffer.black_box_info.inputs_delay = 0;
comms_buffer.black_box_info.output_layer_index = 0;
comms_buffer.black_box_info.forward_prop = parity_propagate_forward;
comms_buffer.black_box_info.set_backprop_counter = parity_set_backprop_counter
comms_buffer.black_box_info.get_backprop_counter = parity_get_backprop_counter
comms_buffer.black_box_info.calc_grad = parity_calc_grad;
comms_buffer.black_box_info.update_weights = parity_update_weights;
comms_buffer.black_box_info.set_target_output = parity_set_target_output;
comms_buffer.black_box_info.get_target_output = parity_get_target_output;
comms_buffer.black_box_info.get_output = parity_get_output;
comms_buffer.black_box_info.set_input = parity_set_input;
comms_buffer.black_box_info.get_input = parity_get_input;
/* Layer parity:Output_Layer */
if (layer_index == 0) {
    comms_buffer.layer_index = 0;
    comms_buffer.layer_type = 5;
    comms_buffer.layer_name = "parity:Output_Layer";
    comms_buffer.n_nodes = 1;
    comms_buffer.delay = 0;
    comms_buffer.xdim = 1;
    comms_buffer.ydim = 1;
    comms_buffer.values = b0_l0_v;
    comms_buffer.thresholds = b0_l0_t;
    comms_buffer.delta_thresholds = b0_l0_dt;
    comms_buffer.credit = b0_l0_c;
    comms_buffer.order = 0;
    (comms_buffer.connections)[0].type = 0;
    (comms_buffer.connections)[0].order = 1;
```

```
        (comms_buffer.connections)[0].shared = 0;
        (comms_buffer.connections)[0].size = 2;
        (comms_buffer.connections)[0].delay = 0;
        (comms_buffer.connections)[0].from_layer_name = "parity:Hidden_Layer";
        (comms_buffer.connections)[0].tess_xdim = 2;
        (comms_buffer.connections)[0].tess_ydim = 1;
        (comms_buffer.connections)[0].tess_xoverlap = 2;
        (comms_buffer.connections)[0].tess_yoverlap = 0;
        (comms_buffer.connections)[0].tess_xoffset = 0;
        (comms_buffer.connections)[0].tess_yoffset = 0;
        (comms_buffer.connections)[0].from_bb_index = 0;
        (comms_buffer.connections)[0].from_layer_index = 1;
        (comms_buffer.connections)[0].from_size = 2;
        (comms_buffer.connections)[0].from_xdim = 2;
        (comms_buffer.connections)[0].from_ydim = 1;
        (comms_buffer.connections)[0].weights = b0_Output_Layer1;
        (comms_buffer.connections)[0].delta_weights = b0_Output_Layer1d;
        comms_buffer.n_inputs = 1;
        comms_buffer.n_outputs = 0;
        return (&comms_buffer); /* success!! */
    } /* end if for Layer parity:Output_Layer
     * (number 0) */
    /* Layer parity:Hidden_Layer */
    if (layer_index == 1) {
        comms_buffer.layer_index = 1;
        comms_buffer.layer_type = 5;
        comms_buffer.layer_name = "parity:Hidden_Layer";
        comms_buffer.n_nodes = 2;
        comms_buffer.delay = 0;
        comms_buffer.xdim = 2;
        comms_buffer.ydim = 1;
        comms_buffer.values = b0_l1_v;
        comms_buffer.thresholds = b0_l1_t;
        comms_buffer.delta_thresholds = b0_l1_dt;
        comms_buffer.credit = b0_l1_c;
        comms_buffer.order = 0;
        (comms_buffer.connections)[0].type = 0;
```

```
        (comms_buffer.connections)[0].order = 1;
        (comms_buffer.connections)[0].shared = 0;
        (comms_buffer.connections)[0].size = 4;
        (comms_buffer.connections)[0].delay = 0;
        (comms_buffer.connections)[0].from_layer_name = "$INPUTS";
        (comms_buffer.connections)[0].tess_xdim = 2;
        (comms_buffer.connections)[0].tess_ydim = 1;
        (comms_buffer.connections)[0].tess_xoverlap = 2;
        (comms_buffer.connections)[0].tess_yoverlap = 0;
        (comms_buffer.connections)[0].tess_xoffset = 0;
        (comms_buffer.connections)[0].tess_yoffset = 0;
        (comms_buffer.connections)[0].from_bb_index = 0;
        (comms_buffer.connections)[0].from_layer_index = -1; /* $INPUTS */
        (comms_buffer.connections)[0].from_size = 2;
        (comms_buffer.connections)[0].from_xdim = 2;
        (comms_buffer.connections)[0].from_ydim = 1;
        (comms_buffer.connections)[0].weights = b0_Hidden_Layer2;
        (comms_buffer.connections)[0].delta_weights = b0_Hidden_Layer2d;
        comms_buffer.n_inputs = 1;
        comms_buffer.n_outputs = 1;
        return (&comms_buffer); /* success!! */
    } /* end if for Layer parity:Hidden_Layer
     * (number 1) */
    return ((LB_PTR) NULL);
        } /* end if for black box parity (number: 0) */
        return ((LB_PTR) NULL);
    } /* end parity_query_network */ void
parity_ascii_dump_network (int formatted)
{
    int         counter1, counter2, counter3, counter4;
    float       *weights;

if (!formatted)
printf ("\n\n#");
```

```
    if (formatted)
printf ("\n\nBlackBox: parity");

if (formatted)
printf ("\nIterations: %d", b0bcounter);

else
printf ("\n%d", b0bcounter);

if (formatted)
printf ("\nLayer: parity:Output_Layer");
    /* print for parity:Output_Layer */
    for (counter4 = 0; counter4 < 1; counter4++) {
for (counter3 = 0; counter3 < 1; counter3++) { if (formatted)
printf ("\nNode[%d,%d]:", counter3, counter4);

if (formatted)
printf ("\n   Bias=%.12f", b0_10_t[counter3 + (1 * counter4)]);
    else
printf ("\n%.12f", b0_10_t[counter3 + (1 * counter4)]);
} /* end for counter3 */
    } /* end for counter4 */ if (formatted)
printf ("\nConnection from parity:Hidden_Layer:");
    for (counter4 = 0; counter4 < 1; counter4++) {
for (counter3 = 0; counter3 < 1; counter3++) { if (formatted)
printf ("\nNode[%d,%d]:", counter3, counter4);
    weights = b0_Output_Layer1 + (counter3 * 2) + (counter4 * 2);
    for (counter1 = 0; counter1 < 1; counter1++) {
if (formatted)
    printf ("\n");
```

```
for (counter2 = 0; counter2 < 2; counter2++) {
    if (formatted)
printf ("%.12f ", *weights++);
    else
printf ("\n%.12f ", *weights++);
} /* end for */
    } /* end for */
} /* end for */
    } /* end for */ if (formatted)
printf ("\nLayer: parity:Hidden_Layer");
    /* print for parity:Hidden_Layer */
    for (counter4 = 0; counter4 < 1; counter4++) {
for (counter3 = 0; counter3 < 2; counter3++) { if (formatted)
printf ("\nNode[%d,%d]:", counter3, counter4);

if (formatted)
printf ("\n   Bias=%.12f", b0_l1_t[counter3 + (2 * counter4)]);
    else
printf ("\n%.12f", b0_l1_t[counter3 + (2 * counter4)]);
} /* end for counter3 */
    } /* end for counter4 */ if (formatted)
printf ("\nConnection from $INPUTS:");
    for (counter4 = 0; counter4 < 1; counter4++) {
for (counter3 = 0; counter3 < 2; counter3++) { if (formatted)
printf ("\nNode[%d,%d]:", counter3, counter4);
    weights = b0_Hidden_Layer2 + (counter3 * 2) + (counter4 * 4);
    for (counter1 = 0; counter1 < 1; counter1++) {
if (formatted)
    printf ("\n");
```

```
    for (counter2 = 0; counter2 < 2; counter2++) {
        if (formatted)
    printf ("%.12f ", *weights++);
        else
    printf ("\n%.12f ", *weights++);
    } /* end for */
    weights += 2;
        } /* end for */
    } /* end for */
        } /* end for */
        if (!formatted)
    printf ("\n\n#");
        printf ("\n");
    } /* end parity_ascii_dump_network */ void
    parity_load_ascii_network ()
    {
        int         counter1, counter2, counter3, counter4;
        float       *weights;

{
    char        c;
    do {
        am_fread (&c, sizeof (char), 1, stdin);
    } while (c != '#');

} scanf ("\n%d", &b0bcounter);
        /* read for parity:Output_Layer */
        for (counter4 = 0; counter4 < 1; counter4++) {
    for (counter3 = 0; counter3 < 1; counter3++) { scanf ("%f", &b0_10_t[counter3 + (1 * counter4)]);
    } /* end for counter3 */
```

```
    } /* end for counter4 */
    for (counter4 = 0; counter4 < 1; counter4++) {
for (counter3 = 0; counter3 < 1; counter3++) {
    weights = b0_Output_Layer1 + (counter3 * 2) + (counter4 * 2);
    for (counter1 = 0; counter1 < 1; counter1++) {
for (counter2 = 0; counter2 < 2; counter2++) {
    scanf ("%f", weights++);
} /* end for */
    } /* end for */
} /* end for */
    } /* end for */
    /* read for parity:Hidden_Layer */
    for (counter4 = 0; counter4 < 1; counter4++) {
for (counter3 = 0; counter3 < 2; counter3++) { scanf ("%f", &b0_l1_t[counter3 + (2 * counter4)]);
} /* end for counter3 */
    } /* end for counter4 */
    for (counter4 = 0; counter4 < 1; counter4++) {
for (counter3 = 0; counter3 < 2; counter3++) {
    weights = b0_Hidden_Layer2 + (counter3 * 2) + (counter4 * 4);
    for (counter1 = 0; counter1 < 1; counter1++) {
for (counter2 = 0; counter2 < 2; counter2++) {
    scanf ("%f", weights++);
} /* end for */
weights += 2;
    } /* end for */
} /* end for */
    } /* end for */

{
int         code;
char        c;
do {
    code = am_fread (&c, sizeof (char), 1, stdin);
} while (code);
```

```
    }
} /* end parity_load_ascii_network */

/* network_initialize: Init simulation, optionaly load dump. */
void
network_initialize (char *filename, int verbose)
{
    /* initialize the simulator */
    if (parity_init_network ()) {
fprintf (stderr, "%s", parity_error_string ());
am_exit (EXIT_FAILURE);
    } /* end if init */
    /* x load dump file? */
    if (filename != (char *) NULL) {
if (verbose)
    printf ("\nLoading Saved Network: %s", filename);
if (parity_load_network (filename)) {
    fprintf (stderr, "%s", parity_error_string ());
    am_exit (EXIT_FAILURE);
} /* end if load_network */
    } /* end if filename */
    if (verbose) {
printf ("\n\nBackpropagation Learning");
printf ("\n\nBlack Boxes:\n");
printf ("\nparity (Saved at Backprop Iteration %d)", parity_get_backprop_count
    } /* end if verbose */
} /* end network_initialize */

/* network_forward: Propagate all bb's forward. */
void
network_forward (int iterations, void (*generator) (void))
{
    while (iterations--) {
generator ();
parity_network_forward ();
    } /* end while */
} /* end network_forward */
```

```
/* network_learn: Propagate all bb's forward then backward */
void
network_learn (int iterations, void (*generator) (void))
{
    parity_network_learn (iterations, generator);
} /* end network_learn */ void
network_clear_delays ()
{
    parity_clear_delays ();
} /* end network_clear_delays */ void
network_dump (char *filename)
{
    if (parity_dump_network (filename)) {
fprintf (stderr, "%s", parity_error_string ());
    } /* end if dump */
} /* end network_dump */ void
network_load (char *filename)
{
    if (parity_load_network (filename)) {
fprintf (stderr, "%s", parity_error_string ());
    } /* end if load */
} /* end network_load */ void
network_ascii_dump (int formatted)
{
    parity_ascii_dump_network (formatted);
} /* end network_ascii_dump */ void
```

```
network_load_ascii ()
{
    parity_load_ascii_network ();
} /* end network_load_ascii */

LB_PTR
network_query (int bbindex, int layerindex)
{
    return (parity_query_network (bbindex, layerindex));
} /* end network_query */

/* network_forward_print: print outputs/target for each bb */
void
network_forward_print (int iterations, void (*generator) (void))
{
    int         icounter, counter;
    float       *ptr;

for (icounter = 0; icounter < iterations; icounter++) {
generator ();
parity_network_forward ();
printf ("\nIteration: %d", icounter);
printf ("\nblack box parity:");
ptr = parity_get_output ();
counter = 1;
printf ("\n\tOutputs:");
while (counter--)
    printf (" %f", *ptr++);
ptr = parity_get_target_output ();
counter = 1;
printf ("\n\tTargets:");
while (counter--)
    printf (" %f", *ptr++);
    } /* end while */
} /* end network_forward_print */

/* network_forward_pdpfa: calc pd, pfa, pfn */
```

```
void
network_forward_pdpfa (int iterations, void (*generator) (void), float thresho
{
    int         counter;
    float       *ptr1, *ptr2;
    int         total = iterations;
    float       parity_sum;
    int         parity_detections = 0;
    double      parityMin[1];
    double      parityMax[1];
    float       parityMean[1];
    float       paritySquare[1];

if (!iterations)
return;
    threshold *= threshold;
    for (counter = 0; counter < 1; counter++) { /* init */
parityMin[counter] = AM_HUGE_VAL;
parityMax[counter] = -AM_HUGE_VAL;
parityMean[counter] = 0.0;
paritySquare[counter] = 0.0;
    } /* end for */
    while (iterations--) {
generator ();
parity_network_forward ();
parity_sum = 0.0;
ptr1 = parity_get_output ();
ptr2 = parity_get_target_output ();
for (counter = 0; counter < 1; counter++) { /* calc sum of squared
 * diffs */
    float           val, target, diff;

val = *ptr1++;
    target = *ptr2++;
    parityMean[counter] += val;
    paritySquare[counter] += val * val;
    if (val < parityMin[counter])
```

What is claimed is:

1. An electrical neural network, comprising:

an input layer comprising at least one neuron circuit having at least one input and at least one output;

a hidden layer comprising a plurality of neuron circuits, each neuron circuit being one of inhibitory and excitatory and having at least one input and an output;

an output layer comprising at least two neuron circuits having at least one input and an output;

a plurality of first synapses, each first synapse connecting the output of a neuron circuit in the input layer to the input of at least one neuron circuit in the hidden layer and having a connection weight;

a plurality of second synapses, each second synapse connecting the output of a neuron circuit in the hidden layer to an input of at most one neuron circuit in the output layer and having a connection weight with a magnitude and a polarity;

each neuron in the hidden layer being connected to only one corresponding neuron circuit in the output layer; and wherein each neuron circuit in the hidden layer receives a reinforcement signal from the corresponding neuron circuit in the output layer to update the connection weight of a synapse connected between the output of a neuron circuit in the input layer and the input of the neuron circuit in the hidden layer, wherein the reinforcement signal is independent of the magnitude of the connection weight of any synapse connected between the output of the neuron circuit in the hidden layer and the input of any neuron circuit connected posterior to the neuron circuit in the hidden layer.

2. The electrical neural network of claim 1, wherein the electrical neural network is embodied in an integrated circuit.

3. An electrical neural network, comprising:

an input layer comprising at least one neuron circuit having at least one input and at least one output;

a first hidden layer comprising a plurality of neuron circuits, each neuron circuit being one of inhibitory and excitatory and having a plurality of inputs and an output;

a second hidden layer comprising a plurality of neuron circuits, each neuron circuit being one of inhibitory and excitatory and having a plurality of inputs and an output;

an output layer comprising at least two neuron circuits having a plurality of inputs and an output;

a plurality of first synapses, each first synapse connecting outputs of neuron circuits in the input layer to inputs of neuron circuits in the first hidden layer and having a connection weight;

a plurality of second synapses, each second synapse connecting the output of a neuron circuit in the first hidden layer to an input of at most one neuron circuit in the second hidden layer and having a connection weight; and a plurality of third synapses, each third synapse connecting the output of a neuron circuit in the second hidden layer to an input of at most one neuron circuit in the output layer and having a connection weight.

4. The electrical neural network of claim 3, wherein each neuron circuit in the hidden layer receives a reinforcement signal from the corresponding neuron circuit in the output layer to update the connection weight of a synapse connected between the output of a neuron circuit in the input layer and the input of the neuron circuit in the hidden layer, wherein the reinforcement signal is independent of the magnitude of the connection weight of any synapse connected between the output of the neuron circuit in the hidden layer and the input of any neuron circuit connected posterior to the neuron circuit in the hidden layer.

5. The electrical neural network of claim 4, wherein the electrical neural network is embodied in an integrated circuit.

6. The electrical neural network of claim 3, wherein the electrical neural network is embodied in an integrated circuit.

7. A method for training an electrical neural network which has an input layer having at least one neuron, a hidden layer having a plurality of neurons, each neuron being one of inhibitory and excitatory, an output layer having at least one neuron, a plurality of first synapses, each first synapse connecting a neuron in the input layer to a neuron in the hidden layer and having a connection weight, a plurality of second synapses, each second synapse connecting a neuron in the hidden layer to a neuron in the output layer and having a connection weight with a magnitude and a polarity, each path from any neuron in the hidden layer to any neuron in the output layer having a polarity, the method comprising the steps of:

(a) preparing a set of training data pairs, each training data pair comprising an input and a corresponding desired output;

(b) applying an input of a selected training data pair to the input layer of the neural network;

(c) obtaining an actual output from each neuron of the output layer of the neural network;

(d) comparing the actual output to the desired output of the selected training data pair to obtain an error signal having a polarity for each neuron of the output layer, wherein the error signal is otherwise independent of the magnitude of the connection weight of any of the second synapses; and (e) for each neuron in the hidden layer, adjusting the connection weight of the synapse connected anterior to the neuron according to the error signal, and i) with a polarity opposite the polarity of the error signal when the polarity determined for the path for the neuron is inhibitory and ii) with the polarity of the error signal when the polarity determined for the path for the neuron is excitatory.

8. The method of claim 7, wherein the output layer of the neural network has a plurality of neurons, and each neuron in the hidden layer has at most one second synapse to a corresponding neuron in the output layer and receives the error signal from the corresponding neuron in the output layer.

9. The method of claim 7, wherein the hidden layer comprises a plurality of layers, each layer having a plurality of neurons, each neuron having a plurality of inputs, and wherein each neuron in an anterior layer connects to an input of only one neuron in any posterior layer.

* * * * *